United States Patent
Gladkov et al.

(10) Patent No.: US 11,132,827 B2
(45) Date of Patent: Sep. 28, 2021

(54) ARTIFICIAL REALITY SYSTEM ARCHITECTURE FOR CONCURRENT APPLICATION EXECUTION AND COLLABORATIVE 3D SCENE RENDERING

(71) Applicant: Facebook Technologies, LLC, Menlo Park, CA (US)

(72) Inventors: Denis Gladkov, San Francisco, CA (US); Daniel Lehmann, Los Gatos, CA (US); Paul B. Menage, Mountain View, CA (US); Clifford Merritt Boyd, Mountain View, CA (US); Anton Vaneev, Oceanside, NY (US); Luiz Alfonso Coimbra Barbosa Silva, Redwood City, CA (US); Mandeep S Baines, Saratoga, CA (US); Aaron David Lieberman, Seattle, WA (US); Rodney Huff, Tiburon, CA (US); Cyril Daniel Saint Girons, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/576,367

(22) Filed: Sep. 19, 2019

(65) Prior Publication Data
US 2021/0090315 A1    Mar. 25, 2021

(51) Int. Cl.
| | |
|---|---|
| G06T 5/00 | (2006.01) |
| G06T 15/00 | (2011.01) |
| G06F 9/455 | (2018.01) |
| G06F 3/01 | (2006.01) |

(52) U.S. Cl.
CPC .......... *G06T 15/005* (2013.01); *G06F 3/011* (2013.01); *G06F 3/017* (2013.01); *G06F 9/45512* (2013.01)

(58) Field of Classification Search
CPC ........ G06T 15/005; G06F 3/011; G06F 3/017; G06F 9/45512
USPC ......................................................... 345/419
See application file for complete search history.

(56) References Cited

U.S. PATENT DOCUMENTS

| | | | |
|---|---|---|---|
| 2012/0154557 A1* | 6/2012 | Perez ............... | H04N 21/47205 348/53 |
| 2012/0210254 A1* | 8/2012 | Fukuchi ................. | G06F 3/012 715/757 |
| 2014/0354685 A1* | 12/2014 | Lazarow ............ | G02B 27/0172 345/633 |
| 2018/0286116 A1* | 10/2018 | Babu J D ................ | G09G 5/14 |
| 2019/0108578 A1* | 4/2019 | Spivack .................. | G09G 5/14 |
| 2019/0369836 A1* | 12/2019 | Faulkner .................. | G06T 7/50 |

(Continued)

*Primary Examiner* — Jin Ge
(74) *Attorney, Agent, or Firm* — Shumaker & Sieffert, P.A.

(57) ABSTRACT

The disclosure describes a distributed, pluggable architecture for an artificial reality (AR) system that enables concurrent execution and collaborative scene rendering for multiple artificial reality applications. For example, an AR system includes an image capture device configured to capture image data representative of a physical environment. The AR system also includes a head-mounted display (HMD) configured to output artificial reality content. The AR system further includes a plurality of concurrently executing artificial reality client applications. The AR system also includes a concurrent application engine configured to control rendering the artificial reality content as a common scene that include one or more objects from each of the plurality of artificial reality applications.

13 Claims, 12 Drawing Sheets

(56) References Cited

U.S. PATENT DOCUMENTS

| | | | | |
|---|---|---|---|---|
| 2019/0371279 A1* | 12/2019 | Mak | .......................... | G09G 5/38 |
| 2019/0377473 A1* | 12/2019 | Osman | .................... | G06F 3/016 |
| 2019/0392212 A1* | 12/2019 | Sawhney | ............ | G06K 9/00201 |
| 2020/0004759 A1* | 1/2020 | Brebner | .................... | G06F 8/10 |
| 2020/0019295 A1* | 1/2020 | Spivack | .................. | H04L 51/04 |
| 2020/0066047 A1* | 2/2020 | Karalis | ............... | G06F 3/04845 |

* cited by examiner

ARTIFICIAL REALITY SYSTEM ARCHITECTURE FOR CONCURRENT APPLICATION EXECUTION AND COLLABORATIVE 3D SCENE RENDERING

TECHNICAL FIELD

This disclosure generally relates to artificial reality systems, such as virtual reality, mixed reality and/or augmented reality systems, and more particularly, to user interfaces of artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). During operation, the user typically interacts with the artificial reality system to select content, launch an application or otherwise configure the system. When executing, an artificial reality application typically takes control over the entire display, i.e., field of view of the user, and renders 3D content for the entire display, thereby providing an artificial reality experience. If desired, the user interacts with the artificial reality system to close an application and launch a different artificial reality application, which assumes control of the entire display and generates its own 3D content for the entire display.

SUMMARY

In general, this disclosure describes a distributed, pluggable architecture for an artificial reality (AR) system that enables concurrent execution and collaborative scene rendering for multiple artificial reality applications. That is, in various examples, this disclosure describes modular techniques and a distributed client/server architecture by which a head-mounted display of an artificial reality system enables multiple artificial reality applications to contribute respective portions of 3D content for rendering to the user as a common artificial reality experience.

As one example, the artificial reality system includes a concurrent application engine comprising a centralized scene controller (referred to as a "shell") that presents a client interface (e.g., application programming interface (API)) by which the executable artificial reality applications register with the shell and communicate three-dimensional (3D) modeling information of objects on the rendered scene. The client interface provides a set of functions by which the AR applications specify 3D modeling information of objects for the common AR environment. The centralized scene controller aggregates the modeling information of objects from each of the artificial reality applications, positions the respective objects within a common scene, and renders a 3D visualization of the objects to the user such that the 3D content from the concurrently executing artificial reality applications is simultaneously displayed on the common scene. Moreover, each AR application may interact with the centralized scene controller processes to specify positional and appearance properties for their respective objects, including transforms, borders, and opacity. In this way, the architecture enables concurrently executing applications to collaborate to specify and control an artificial realty scene to be rendered to the user.

In one example implementation, the artificial reality interface may support an underlying serialization protocol between the artificial reality applications and the shell to enable real-time dynamic updates to the respective 3D models associated with each application, thereby allowing each of the applications to concurrently execute and be properly rendered to the user even in response to interaction with and manipulation by the user. In this way, the system architecture provides a multitasking-like experience to the user in which the user may interact with multiple concurrently executing AR applications presented to the user in a common 3D scene.

The centralized scene controller may distinguish several kinds of artificial reality applications, which can be specified through the client interface. One example of a special class of application, referred to as "environment", has the ability to specify global attributes of the collaborative scene, such as scene light, direction and intensity.

In some examples, the client interface provides a set of functions used to model the artificial reality applications in the AR environment. As one example, the client interface provides data specifying objects and surfaces, referred to herein as "offer areas," that are suitable for placing the objects. The artificial reality application also requests connections, referred to herein as "attachments," between offer areas and the objects placed on the offer areas. The centralized scene controller constrains the attached objects to pre-allocated volumes in the scene referred to as containers, to constrain objects within a certain volume. In these examples, AR applications may specify container metadata when requesting a connection.

The artificial reality applications provide the modeling information to the shell (e.g., via the serialization protocol) such that the shell may aggregate the modeling information of objects of the artificial reality applications, render the objects of the artificial reality applications based on the aggregate of the modeling information, control interactions between the artificial reality applications, and deliver input and other signals, via the serialization protocol, for the interested artificial reality applications (e.g. to control objects and/or receive events, such as input or other signals).

The system and techniques may provide one or more technical advantages that provide at least one practical application. For example, by enabling concurrent execution of artificial reality applications that collaborate to control content for a common 3D scene, the HMD described herein provides users with a multitasking environment for artificial reality applications unlike traditional artificial reality systems that require frequent switching (e.g., closing and restarting) between artificial reality applications. Moreover, the system and architecture shifts the rendering control from the artificial reality applications to a backend shell using a pluggable framework, which enables the shell to determine which objects and/or which surfaces of those objects are suitable for placing other objects in a common rendered scene. That is, by presenting interface(s) by which client applications send object models including texture information to the shell, the artificial reality system takes control of composing scene graphs, which allows artificial reality applications to be taken out of their isolation. Moreover, by shifting rendering control to the shell, the system can effectively enforce quality-of-service restraints. For example, the shell can constrain rendering complexity at the application (or sub-application) level by simplifying rendering settings, adjusting geometry, and decline to render portions of the scene graph in response to resource availability.

In one example, an artificial reality system includes an image capture device configured to capture image data representative of a physical environment. The artificial reality system also includes a head-mounted display (HMD) configured to output artificial reality content. The artificial reality system further includes a plurality of concurrently executing artificial reality client applications. The artificial reality system also includes a concurrent application engine configured to control rendering the artificial reality content as a common scene that include one or more objects from each of the plurality of artificial reality applications.

In another example, a method includes receiving, by a concurrent application engine of an artificial reality system, modeling information of objects from each of a plurality of artificial reality applications. The method also includes aggregating, by the concurrent application engine, the modeling information of objects from each of the plurality of artificial reality applications. The method further includes rendering, by the concurrent application engine, artificial reality content as a common scene that include the objects from each of the plurality of artificial reality applications. The method also includes outputting, by a head mounted display (HMD) of the artificial reality system, the common scene.

In another example, a non-transitory computer-readable medium comprises instructions that, when executed, cause one or more processors of an artificial reality system to: receive modeling information of objects from each of a plurality of artificial reality applications; aggregate the modeling information of objects from each of the plurality of artificial reality applications; render artificial reality content as a common scene that include the objects from each of the plurality of artificial reality applications; and output the common scene.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
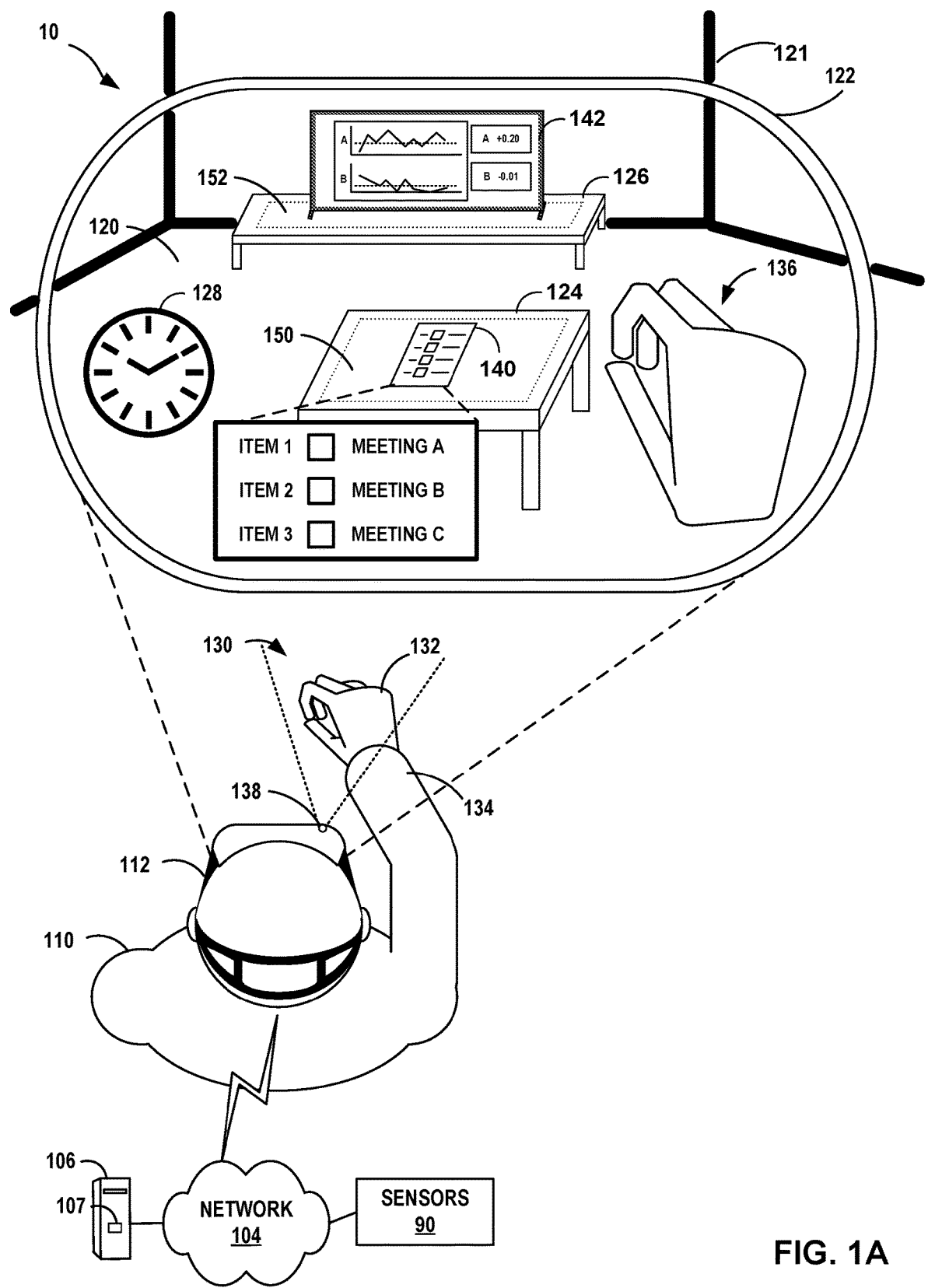
FIG. 1A is an illustration depicting an example artificial reality system that enables concurrent execution of multiple artificial reality applications and collaborative scene rendering, in accordance with the techniques of the disclosure.

FIG. 1A is an illustration depicting an example artificial reality system 10 that enables concurrent execution of multiple artificial reality applications and collaborative scene rendering, in accordance with the techniques of the disclosure. In the example of FIG. 1A, artificial reality system 10 includes head mounted device (HMD) 112, console 106 and, in some examples, one or more external sensors 90.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. In some examples, artificial reality content 122 may comprise a mixture of real-world imagery (e.g., hand 132, earth 120, wall 121) and virtual objects (e.g., virtual content items 124, 126, 140 and 142). In the example of FIG. 1A, artificial reality content 122 comprises virtual content items 124, 126 represent virtual tables and may be mapped (e.g., pinned, locked, placed) to a particular position within artificial reality content 122. Similarly, artificial reality content 122 comprises virtual content item 142 that represents a virtual display device that is also mapped to a particular position within artificial reality content 122. A position for a virtual content item may be fixed, as relative to a wall or the earth, for instance. A position for a virtual content item may be variable, as relative to a user, for instance. In some examples, the particular position of a virtual content item within artificial reality content 122 is associated with a position within the real-world, physical environment (e.g., on a surface of a physical object).

In the example artificial reality experience shown in FIG. 1A, virtual content items 124, 126 are mapped to positions on the earth 120 and/or wall 121. The artificial reality system 10 may render one or more virtual content items in response to a determination that at least a portion of the location of virtual content items is in the field of view 130 of user 110. That is, virtual content appears only within artificial reality content 122 and does not exist in the real world, physical environment.

During operation, an artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. In some examples, the artificial reality application may render images of real-world objects, such as the portions of hand 132 and/or arm 134 of user 110, that are within field of view 130 along with the virtual objects, such as within artificial reality content 122. In other examples, the artificial reality application may render virtual representations of the portions of hand 132 and/or arm 134 of user 110 that are within field of view 130 (e.g., render real-world objects as virtual objects) within artificial reality content 122. In either example, user 110 is able to view the portions of their hand 132, arm 134, and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify hand 132, including optionally identifying individual fingers or the thumb, and/or all or portions of arm 134 of user 110. Further, artificial reality system 10 tracks the position, orientation, and configuration of hand 132 (optionally including particular digits of the hand), and/or portions of arm 134 over a sliding window of time.

In accordance with the techniques of this disclosure, artificial reality system 10 generates a common scene of an artificial reality environment that is collaboratively constructed and simultaneously controlled by multiple artificial reality applications concurrently executing within the artificial reality system. As further described below, concurrent application engine 107 includes a centralized scene controller (referred to as a "shell") that presents a client interface (e.g., application programming interface (API)) by which the artificial reality applications register with the shell and communicate modeling information of objects of artificial reality applications. The centralized scene controller aggregates the modeling information from each of the artificial reality applications, positions the respective objects within a common 3D scene, and renders the 3D visualization of the objects to the user such that the artificial reality applications are concurrently running and displayed on the common scene.

Rather than requiring only artificial reality applications that are typically fully immersive of the whole field of view 130 within artificial reality content 122, artificial reality system 10 enables generation and display of artificial reality content 122 by a plurality of artificial reality applications that are concurrently running and which output content for display in a common scene. Artificial reality applications may include environment applications, placed applications, and floating applications. Environment applications may define a scene for the AR environment that serves as a backdrop for one or more applications to become active. For example, environment applications place a user in the scene, such as a beach, office, environment from a fictional location (e.g., from a game or story), environment of a real location, or any other environment. In the example of FIG. 1A, the environment application provides a living room scene within artificial reality content 122.

A placed application is a fixed application that is expected to remain rendered (e.g., no expectation to close the applications) within artificial reality content 122. For example, a placed application may include surfaces to place other objects, such as a table, shelf, or the like. In some examples, a placed application includes decorative applications, such as pictures, candles, flowers, game trophies, or any ornamental item to customize the scene. In some examples, a placed application includes functional applications (e.g., widgets) that allow quick glancing at important information (e.g., agenda view of a calendar). In the example of FIG. 1A, artificial reality content 122 includes virtual tables 124 and 126 that include surfaces to place other objects.

A floating application may include an application implemented on a "floating window." For example, a floating application may include 2D user interfaces, 2D applications (e.g., clock, calendar, etc.), or the like. In the example of FIG. 1A, a floating application may include clock application 128 that is implemented on a floating window within artificial reality content 122. In some examples, floating applications may integrate 3D content. For example, a floating application may be a flight booking application that provides a 2D user interface to view and select from a list of available flights and is integrated with 3D content such as a 3D visualization of a seat selection. As another example, a floating application may be a chemistry teaching application that provides a 2D user interface of a description of a molecule and also shows 3D models of the molecules. In another example, a floating application may be a language learning application that may also show a 3D model of objects with the definition and/or 3D charts for learning progress. In a further example, a floating application may be a video chat application that shows a 3D reconstruction of the face of the person on the other end of the line.

As further described below, artificial reality system 10 includes a concurrent application engine 107 that is configured to concurrently execute multiple artificial reality applications that collaboratively build and share a common artificial reality environment. In the example of FIG. 1A, concurrent application engine 107 receives modeling information of objects of a plurality of artificial reality applications. For instance, concurrent application engine 107 receives modeling information of agenda object 140 of an agenda application to display agenda information. Concurrent application engine 107 also receives modeling information of virtual media object 142 of a media content application to display media content (e.g., GIF, photo, application, live-stream, video, text, web-browser, drawing, animation, 3D model, representation of data files (including two-dimensional and three-dimensional datasets), or any other visible media).

In some examples, the artificial reality applications may, in accordance with the techniques, specify any number of offer areas (e.g., zero or more) that define objects and surfaces suitable for placing the objects. In some examples, the artificial reality application includes metadata describing the offer area, such as a specific node to provide the offer area, pose of the offer area relative to that node, surface shape of the offer area and size of the offer area. In the example of FIG. 1A, the artificial reality application for virtual table 124 defines an offer area 150 on the surface of virtual table 124 to display agenda object 140. The artificial reality application for virtual table 124 may specify, for example, that the position and orientation (e.g., pose) of offer area 150 is on the top of virtual table 124, the shape of offer area 150 as a rectangle, and the size of offer area 150 for placing agenda object 140. As another example, another artificial reality application defines offer area 152 of virtual media object 142. The artificial reality application may specify, for example, that the position and orientation (i.e., pose) of offer area 152 for placing virtual media object 142, the shape of offer 152 as a rectangle, and the size of offer area 150 for placing virtual media object 142.

Artificial reality applications may request one or more attachments that describe connections between offer areas and the objects placed on them. In some examples, attachments include additional attributes, such as whether the object can be interactively moved or scaled. In the example of FIG. 1A, the agenda application requests for an attachment between offer area 150 and agenda object 140 and includes additional attributes indicating agenda object 140 may be interactively moved and/or scaled within offer area 150. Similarly, the media content application requests for an attachment between offer area 152 and virtual media object 142 and includes additional attributes indicating virtual media object 142 is fixed within offer area 152. The centralized scene controller constrains the attached objects to pre-allocated volumes in the scene, referred to as containers, to constrain objects within a certain volume. In these examples, the agenda application and media content application may each specify container metadata when requesting a connection to offer areas.

Alternatively, or additionally, objects are automatically placed on offer areas. For example, a request for attachment for an offer area may specify dimensions of the offer area and the object being placed, semantic information of the offer area and the object being placed, and/or physics information of the offer area and the object being placed. Dimensions of an offer area may include the necessary amount of space for an offer area to support the placement of the object and dimensions of the object may include the size of object. In some examples, an object is automatically placed in a scene based on semantic information, such as the type of object, the type of offer area, and what types of objects can be found on this type of area. For example, an offer area on a body of water may have semantic information specifying that only water compatible objects (e.g., boat) can be placed on the body of water. In some examples, an object is automatically placed in a scene based on physics (or pseudo-physics) information, such as whether an object has enough support in the offer area, whether the object will slide or fall, whether the object may collide with other objects, or the like.

As further described below, concurrent application engine 107 may include a client interface (e.g., API) by which the artificial reality applications register with the shell and communicate modeling information of objects for artificial reality applications. For example, the client interface is a scene graph API that provides a set of functions by which application developers specify modeling information of objects of a plurality of artificial reality applications. For example, application developers may specify a scene graph including objects (referred to as "nodes" in a scene graph), modeling properties of the nodes, and relationships (e.g., spatial and logical) between the nodes of a graphical scene. A scene graph may be a general data structure, such as a graph or tree structure, with a parent/child hierarchy. Properties of the node may include geometry, materials, meshes, and layers of objects. For example, mesh information of an object includes one or more vertices of an object, one or more texture coordinates for each vertex, and one or more texture references of the object. In the example of FIG. 1A, application developers may use the client interface to specify modeling information of agenda object 140 and virtual media object 142. In some examples, the application developers may use the client interface to also specify offer areas 150, 152 and requests for attachments of objects, e.g., agenda object 140 and virtual media object 142, to connect with the offer areas, respectively.

The client interface enables the artificial reality applications to communicate the modeling information of objects of artificial reality applications to the shell. In some examples, the client interface and shell communicate using a serialization format protocol that defines a set of constructs, such as textures, meshes, nodes, and other abstractions for encoding objects of the scene graph. In some examples, the serialization protocol is conceptually based on GL Transmission Format (glTF). For example, in accordance with the techniques of this disclosure, the serialization protocol derives the concepts (e.g., nodes, meshes, materials, textures, lights, etc.) and conventions (e.g., coordinate systems, units of measure, etc.), and is further extended with 2D geometry and animation extensions (e.g., animation can now control any plausibly-animatable property rather than just node transforms). That is, rather than manually specifying meshes for a 2D surface, the serialization protocol may simplify the defining of 2D surfaces. In some examples, the serialization protocol is also used to communicate dynamic updates to the modeling information of the objects. For example, the serialization protocol is used to deliver input and other signals for an interested artificial reality applications (e.g. to control objects and/or receive events, such as input or other signals).

The concurrent application engine 107 aggregates the modeling information of objects of the plurality of artificial reality applications (e.g., agenda application and media content application) and renders the objects on a common scene. More specifically, a shell of concurrent application engine 107 aggregates modeling information of agenda object 140 of the agenda application and virtual media object 142 of the media content application to be rendered on a common scene in which the agenda application and media content application are concurrently running and displayed on the common scene. The shell renders offer areas 150 and 152 and processes (e.g., validates) the requests for attachments to connect objects to the offer areas. For example, the shell of concurrent application engine 107 may render offer area 150 and validates whether agenda object 140 can logically be placed on offer area 150. For example, concurrent application engine 107 determines the layout of offer area 150 based on metadata of offer area 150 and validates whether the layout of offer area 150 may place agenda object 140 on offer area 150. If validated, the shell connects agenda object 140 to offer area 150. Similarly, the shell of concurrent application engine 107 may render offer area 152 and validates whether virtual media object 142 can logically be placed on offer area 152. For example, concurrent application engine 107 determines the layout of offer area 152 based on metadata of offer area 152 and validates whether the layout of offer area 152 may place virtual media object 142 on offer area 152. If validated, the shell connects virtual media object 142 to offer area 152.

In some examples, the shell may automatically place objects on offer areas. For example, request for attachment for offer area 150 may specify dimensions of offer area 150 and agenda object 140, semantic information that describes offer area 150 (e.g., the type of offer area as a flat wooden surface), and/or physics information of offer area 150, such as whether agenda object 140 has enough support to place the object on offer area 150, whether agenda object 140 will slide or fall, and/or whether agenda object 140 may collide with other objects placed on offer area 150.

In some examples, the shell of concurrent application engine 107 controls interactions to the objects on the scene, and delivers input and other signals for interested artificial reality applications. For example, based on sensed data, the artificial reality system 10 detects gestures to objects performed by user 110 and, in response to detecting one or more particular gestures, performs an action to the objects (e.g., moving or scaling the object). More specifically, artificial reality system 10 performs object recognition within image data captured by image capture devices 138 of HMD 112 to identify hand 132, including optionally identifying individual fingers or the thumb, and/or all or portions of arm 134 of user 110. Artificial reality system 10 tracks the position, orientation, and configuration of hand 132 (optionally including particular digits of the hand) and/or portions of arm 134 over a sliding window of time. The artificial reality system 10 analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be each mapped to one or more actions. In some examples, detecting movement may include tracking positions of one or more of the digits (individual fingers and thumb) of hand 132, including whether any of a defined combination of the digits (such as an index finger and thumb) are brought together to touch or approximately touch in the physical environment. In other examples, detecting movement may include tracking an orientation of hand 132 (e.g., fingers pointing toward HMD 112 or away from HMD 112) and/or an orientation of arm 134 (i.e., the normal of the arm facing toward HMD 112) relative to the current pose of HMD 112. The position and orientation of hand 132 (or a portion thereof) may alternatively be referred to as the pose of hand 132 (or a portion thereof).

In the example of FIG. 1A, artificial reality system 10 may detect one or more gestures intended to trigger a desired response by the artificial reality application, such as selecting and translating (e.g., moving) objects of the scene. As further described below with respect to FIGS. 7A-7C, artificial reality system 10 may detect a series of gestures, such as a selection gesture (e.g., pinching) on agenda object 142, a translation gesture to move agenda object 142 out of offer area 150, and deselection gesture to release agenda object 142 in another location within the offer area or to another offer area within the artificial reality content. Once agenda object 142 is released in another location within the offer area or to another offer area, the shell processes the attachment to connect agenda object 142 to the offer area. In these examples, the shell of concurrent application engine 107 may receive dynamic updates, via a serialization protocol, to agenda object 140 (e.g., identified one or more gestures with agenda object 140) and renders the dynamic updates to agenda object 140 on the common scene.

In other examples, the shell may receive dynamic updates, such as network updates or sensor updates, for the artificial reality applications. As one example, the media content application (e.g., video of live stock feed) may receive periodic updates from the media content provider to be displayed on virtual media object 142. In this example, the shell of concurrent application engine 107 delivers input and other signals (e.g., stock ticker updates) for the media content application.

The system and techniques may provide one or more technical advantages that provide at least one practical application. For example, by building artificial reality applications that concurrently run on a shared rendered scene, users are provided with a multitasking environment with concurrently running artificial reality applications unlike traditional artificial reality applications that require frequent switching (e.g., closing and restarting) between artificial reality applications on the HMD. Moreover, the system and architecture shifts the rendering control from the artificial reality applications to the shell, which enables the shell to know which objects or which surfaces of those objects are suitable for placing other objects in a common rendered scene. That is, by sending models of artificial reality applications to the shell, the artificial reality system takes control of scene graphs, which allows artificial reality applications to be taken out of their isolation. Moreover, by shifting rendering control to the shell, the system can effectively enforce quality-of-service constraints. For example, the shell can constrain rendering complexity at the application (or sub-application) level by simplifying rendering settings, adjusting geometry, and decline to render portions of the scene graph in response to resource availability.

Figure 1B:
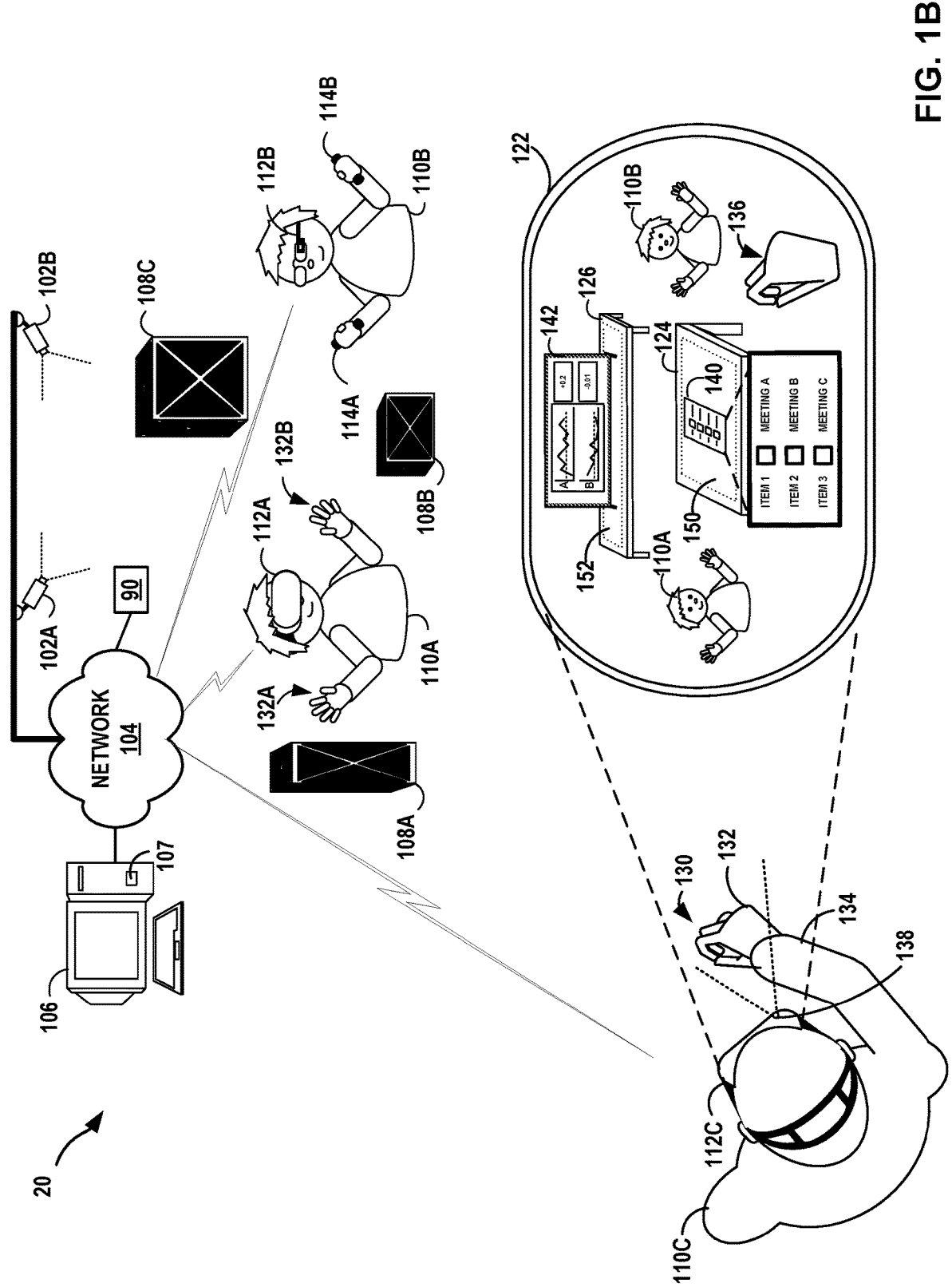
FIG. 1B is an illustration depicting another example artificial reality system that generates a common 3D AR scene of an artificial reality environment in response to content from multiple, concurrently executing artificial reality applications, in accordance with the techniques of the disclosure.

FIG. 1B is an illustration depicting another example artificial reality system 20 that generates a common 3D AR scene of an artificial reality environment in response to content from multiple, concurrently executing artificial reality applications, in accordance with the techniques of the disclosure. Similar to artificial reality system 10 of FIG. 1A, in some examples, artificial reality system 20 of FIG. 1B may generate and render a common scene including objects for a plurality of artificial reality applications within a multi-user artificial reality environment. Artificial reality system 20 may also, in various examples, provide interactive placement and/or manipulation of virtual objects in response detection of one or more particular gestures of a user within the multi-user artificial reality environment.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which a plurality of artificial reality applications executing on console 106 and/or HMDs 112 are concurrently running and displayed on a common rendered scene presented to each of users 110A-110C (collectively, "users 110") based on a current viewing perspective of a corresponding frame of reference for the respective user. That is, in this example, each of the plurality of artificial reality applications constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the plurality of artificial reality applications may render on the same scene, based on a current viewing perspective determined for HMD 112C, artificial reality content 122 having virtual objects 124, 126, 140, and 142 as spatially overlaid upon real world objects 108A-108C (collectively, "real world objects 108"). Further, from the perspective of HMD 112C, artificial reality system 20 renders avatars 122A, 122B based upon the estimated positions for users 110A, 110B, respectively.

Each of HMDs 112 concurrently operates within artificial reality system 20. In the example of FIG. 1B, each of users 110 may be a "participant" (or "player") in the plurality of artificial reality applications, and any of users 110 may be a "spectator" or "observer" in the plurality of artificial reality applications. HMD 112C may operate substantially similar to HMD 112 of FIG. 1A by tracking hand 132 and/or arm 134 of user 110C, and rendering the portions of hand 132 that are within field of view 130 as virtual hand 136 within artificial reality content 122. HMD 112B may receive user inputs from controllers 114A held by user 110B. HMD 112A may also operate substantially similar to HMD 112 of FIG. 1A and receive user inputs by tracking movements of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using another type of communication links.

In a manner similar to the examples discussed above with respect to FIG. 1A, console 106 and/or HMD 112C of artificial reality system 20 generates and renders a scene in which multiple artificial reality applications are concurrently running and displayed on the scene. In particular, concurrent application engine 107, executing on either HMD 112 or console 106, is configured to aggregate and render a scene in which an agenda application and media content application are concurrently running and displayed on artificial reality content 122. In this example, concurrent application engine 107 renders a common scene that includes an agenda object 140 of an agenda application and a virtual media object 142 of a media content application presented to each of users 110. In this way, user 110C may share content of concurrently running artificial reality applications, such as files or media content, with one or more of users 110A and 110B. When sharing content, each of HMDs 112 may output the content, when executed, so that each of users 110 may experience the content together, even if the HMDs are in geographically different locations.

As shown in FIG. 1B, in addition to or alternatively to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. The concurrent application engine 107 may render virtual content items, responsive to such gestures, motions, and orientations, in a manner similar to that described above with respect to FIG. 1A. For example, concurrent application engine 107 may provide interactive placement and/or manipulation of agenda object 140 and/or virtual media object 142 responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Figure 2A:
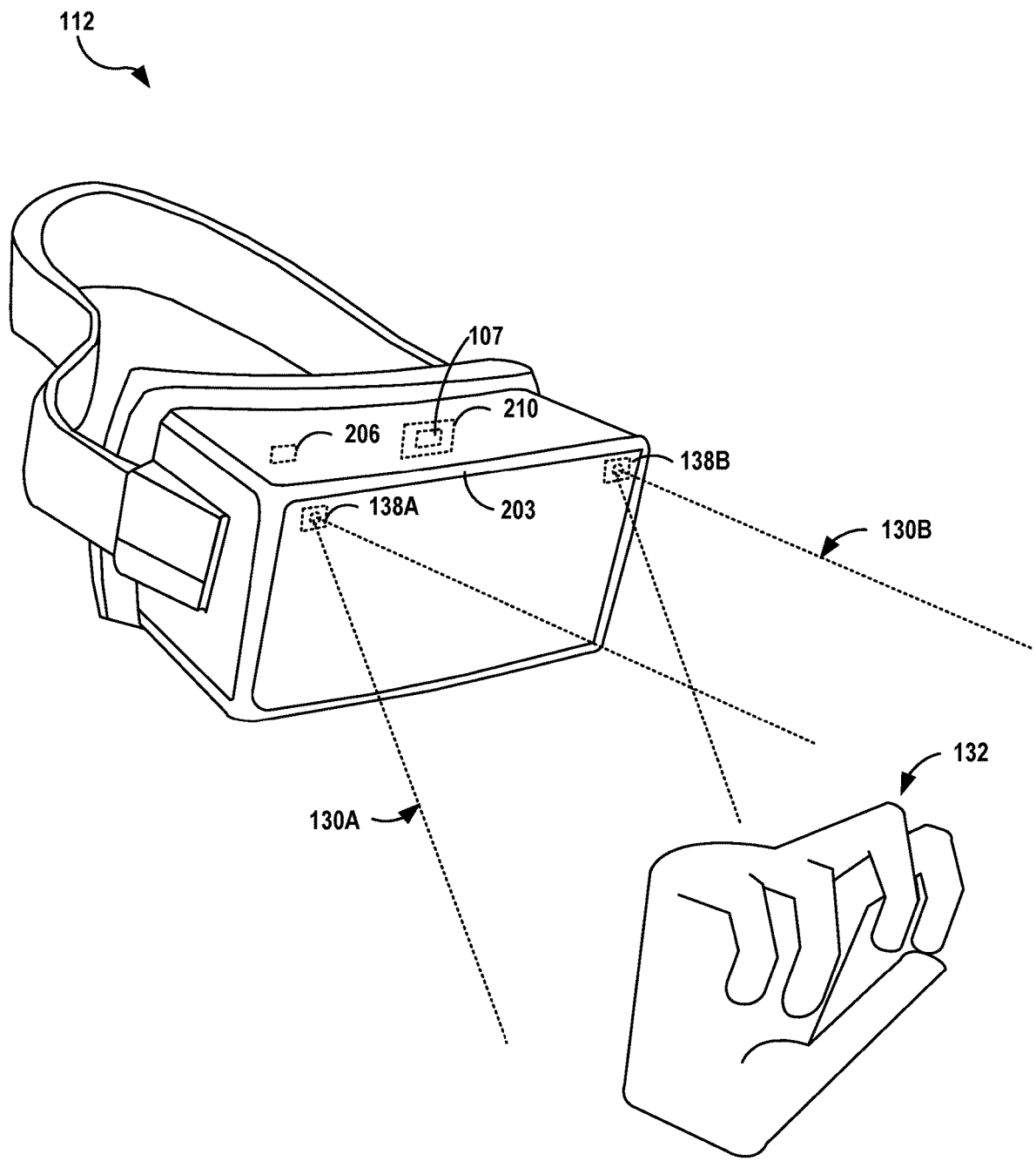
FIG. 2A is an illustration depicting an example HMD that operates in accordance with the techniques of the disclosure.

FIG. 2A is an illustration depicting an example HMD 112 configured to generate a common scene of an artificial reality environment collaboratively constructed using content from multiple, concurrently executing artificial reality applications so that the content from each of the applications is displayed within the common scene, in accordance with the techniques of the disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed data (e.g., image data captured by image capture devices 138 and/or 102, position information from GPS sensors) and an aggregation of modeling information of virtual objects (e.g., virtual content items 124, 126, 140, 142 of FIGS. 1A, 1B) of a plurality of artificial reality applications, generate and render for display on display 203 the objects of a plurality of concurrently executing artificial reality applications is simultaneously displayed on a common scene. As explained with reference to FIGS. 1A and 1B, HMD 112 includes a concurrent application engine 107 configured to combine concurrently executing applications and displays them on a common rendered scene.

In some examples, the concurrent application engine 107 controls interactions to the objects on the scene, and delivers input and other signals for interested artificial reality applications. For example, control unit 210 is configured to, based on the sensed data, identify a specific gesture or combination of gestures performed by the user and, in response, perform an action. As explained herein, control unit 210 may perform object recognition within image data captured by image capture devices 138 to identify a hand 132, fingers, thumb, arm or another part of the user, and track movements of the identified part to identify pre-defined gestures performed by the user. In response to identifying a pre-defined gesture, control unit 210 takes some action, such as generating and rendering artificial reality content that is interactively placed or manipulated for display on electronic display 203.

In accordance with the techniques described herein, HMD 112 may detect gestures of hand 132 and, based on the detected gestures, shift application content items placed on offer areas within the artificial reality content to another location within the offer area or to another offer area within the artificial reality content. For instance, image capture devices 138 may be configured to capture image data representative of a physical environment. Control unit 210 may output artificial reality content on electronic display 203. Control unit 210 may render a first offer area (e.g., offer area 150 of FIGS. 1A and 1B) that includes an attachment that connects an object (e.g., agenda object 140 of FIGS. 1A and 1B). Control unit 210 may identify, from the image data, a selection gesture, where the selection gesture is a configuration of hand 132 that performs a pinching or grabbing motion to the object within offer area, and a subsequent translation gesture (e.g., moving) of hand 132 from the first offer area to a second offer area (e.g., offer area 152 of FIGS. 1A and 1B). In response to control unit 210 identifying the selection gesture and the translation gesture, control unit 210 may process the attachment to connect the object on the second offer area and render the object placed on the second offer area.

Figure 2B:
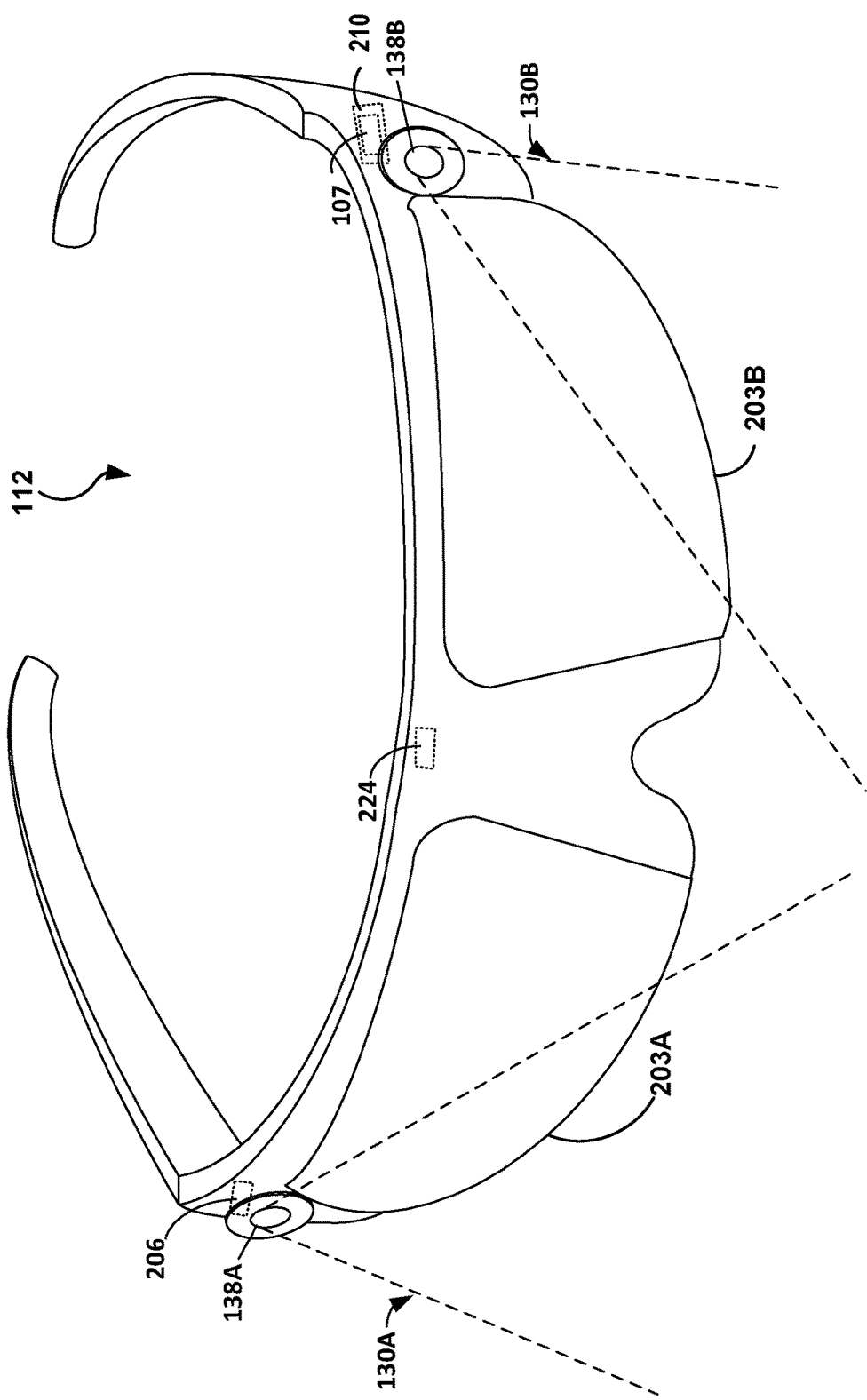
FIG. 2B is an illustration depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, HMD 112 includes control unit 210 configured to, based on the sensed data (e.g., image data captured by image capture devices 138 and/or 102, position information from GPS sensors) and an aggregation of modeling information of virtual objects (e.g., virtual content items 124, 126, 140, 142 of FIGS. 1A and 1B) of a plurality of artificial reality applications, generate and render for display on display 203 the objects of a plurality of concurrently executing artificial reality applications. As explained with reference to FIGS. 1A and 1B, HMD 112 includes a concurrent application engine 107 configured to combine concurrently executing applications and displays them on a common rendered scene. In some examples, the concurrent application engine 107 controls interactions to the objects on the scene, and delivers input and other signals to and from interested artificial reality applications.

Figure 3:
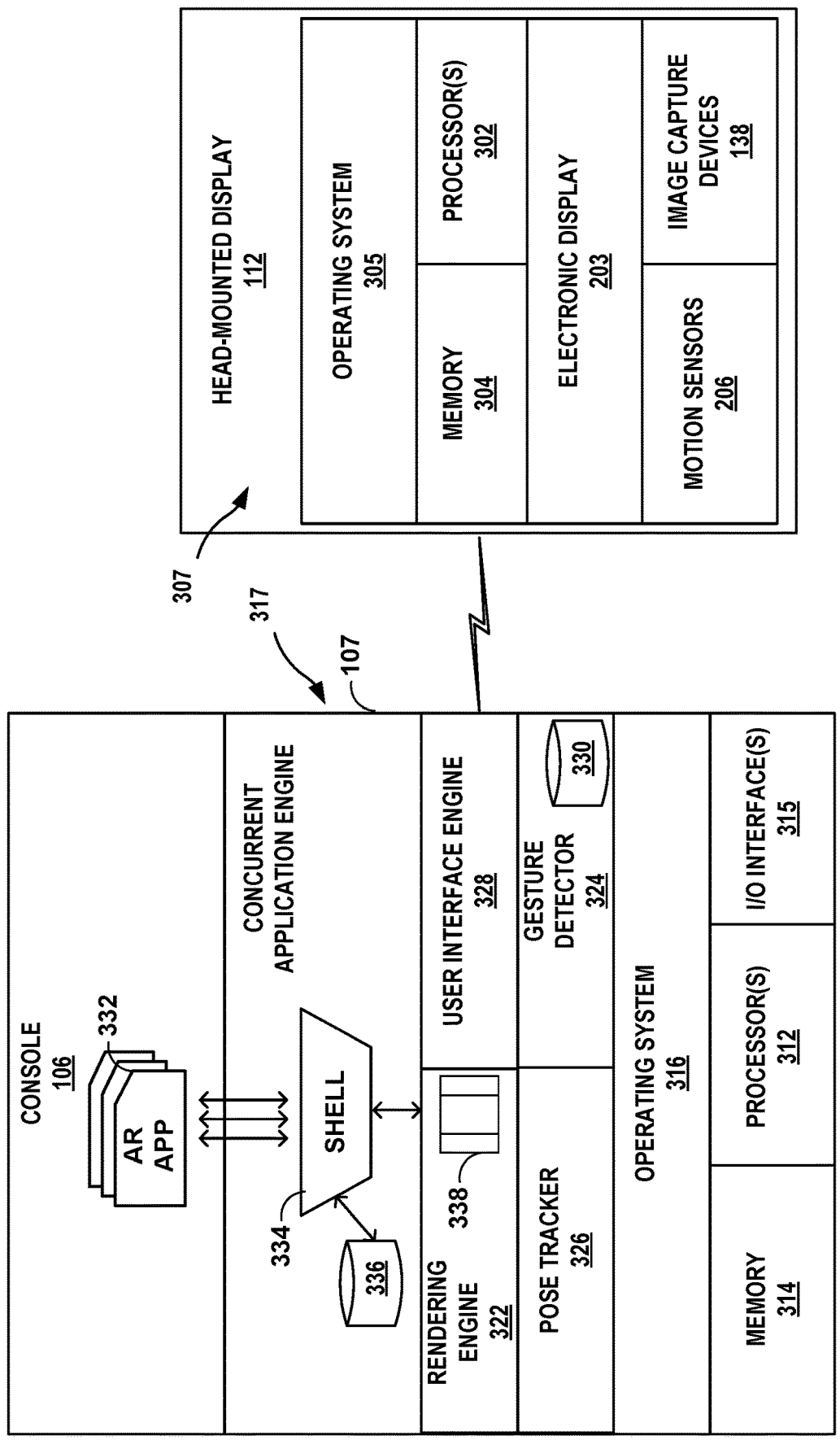
FIG. 3 is a block diagram showing example implementations of a console and an HMD of the artificial reality system that enables concurrent execution of multiple artificial reality applications and collaborative scene rendering, in accordance with the techniques of the disclosure.

FIG. 3 is a block diagram showing example implementations of a console 106 and HMD 112 of the artificial reality system that enables concurrent execution of multiple artificial reality applications and collaborative scene rendering, in accordance with the techniques of the disclosure. In the example of FIG. 3, console 106 performs pose tracking, gesture detection, and generation and rendering of multiple artificial reality applications 322 concurrently running and outputting content for display within a common 3D AR scene on electronic display 203 of HMD 112.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including concurrent application engine 107. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an aggregation of artificial reality applications on a common scene. In this example, software applications 317 include concurrent application engine 107, rendering engine 322, gesture detector 324, pose tracker 326, and user interface engine 328.

In general, concurrent application engine 107 includes functionality to provide and present an aggregation of content generated by a plurality of artificial reality applications 332, e.g., a teleconference application, a gaming application, a navigation application, an educational application, training or simulation applications, and the like. Concurrent application engine 107 may include, for example, one or more software packages, software libraries, hardware drivers, and/or Application Program Interfaces (APIs) for implementing an aggregation of a plurality of artificial reality applications 332 on console 106. As further described below, concurrent application engine 107 presents a client interface that may, in one example, be a scene graph API by which each of artificial reality applications 332 register with shell 334 of the concurrent application engine 107 and communicate modeling information of objects of the artificial reality applications for rendering within common scene 338. For example, application developers may use a scene graph API to specify modeling information of objects (e.g., objects, properties of the objects, and relationships between objects) of artificial reality applications. Application developers may also use the scene graph API to specify offer areas (e.g., offer areas 150, 152 of FIGS. 1A, 1B) and requests for attachments to connect objects with the offer areas.

Shell 334 of concurrent application engine 107 aggregates the modeling information of objects of a plurality of artificial reality applications and conveys aggregated AR content 336 to rendering engine 322 to be rendered on a common scene 338. As further described below with respect to FIG. 5, concurrent application engine 107 may include a client interface (e.g., API) by which the artificial reality applications register with a shell of concurrent application engine 107 and communicate modeling information of objects of artificial reality applications. For example, the client interface is a scene graph API that provides a set of functions by which application developers specify modeling information of objects of a plurality of artificial reality applications. For example, application developers may specify a scene graph including objects (referred to as "nodes" in a scene graph), modeling properties of the nodes, and relationships (e.g., spatial and logical) between the nodes of a graphical scene. In some examples, the application developers may use the client interface of concurrent application engine 107 to also specify offer areas and requests for attachments of objects to connect with the offer areas.

Concurrent application engine 107 aggregates modeling information of objects of the plurality of artificial reality applications and communicates aggregate modeling information 336 to rendering engine 322 for rendering a common scene, where the common scene may present a 3D scene collaboratively constructed and controlled by the plurality of artificial reality applications 332. For example, shell 334 of concurrent application engine 107 may process the modeling information, such as textures, meshes, nodes, and other abstractions of the objects of the plurality of artificial reality applications 332 to construct aggregate content 336 for rendering by rendering engine 322.

Shell 334 of concurrent application engine 107 renders offer areas and processes (e.g., validates) requests for attachments to connect objects to the offer areas in common scene 338. For example, shell 334 of concurrent application engine 107 may render an offer area and validates whether specific objects can logically be placed on the offer area. For example, concurrent application engine 107 determines the layout of the offer area (e.g., based on metadata of the offer area) and validates whether the layout of the offer area may place a specific object on the offer area. If validated, shell 334 connects the specific object to the offer area.

Concurrent application engine 107 constructs the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Based on the sensed data from any of the image capture devices 138 or 102, or other sensor devices, gesture detector 324 analyzes the tracked motions, configurations, positions, and/or orientations of HMD 112 and/or physical objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of hand, digits, and/or arm based on the captured image data, and compare motion vectors of the objects to one or more entries in gesture library 330 to detect a gesture or combination of gestures performed by user 110.

Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, concurrent application engine 107 may control interactions to the objects on the rendered scene, and delivers input and other signals for interested artificial reality applications.

As an example, gesture library 330 may include entries that describe a selection gesture, a translation gesture (e.g., moving, rotating), modification/altering gesture (e.g., scaling), or other gestures that may be performed by users. Gesture detector 324 may process image data from image capture devices 138 to analyze configurations, positions, motions, and/or orientations of a user's hand to identify a gesture, such as a selection gesture. For instance, gesture detector 324 may detect a particular configuration of the hand that represents the selection of an object, the configuration being the hand being positioned to grab the object placed on a first offer area. This grabbing position could be, in some instances, a two-finger pinch where two or more fingers of a user's hand move closer to each other, performed in proximity to the object. Gesture detector 324 may subsequently detect a translation gesture, where the user's hand or arm moves from a first offer area to another location of the first offer area or to a second offer area. Gesture detector may also detect a releasing gesture, where two or more fingers of a user's hand move further from each other. Once the object is released to the second offer area, concurrent application engine 107 processes the attachment to connect the object to the second offer area.

Figure 4:
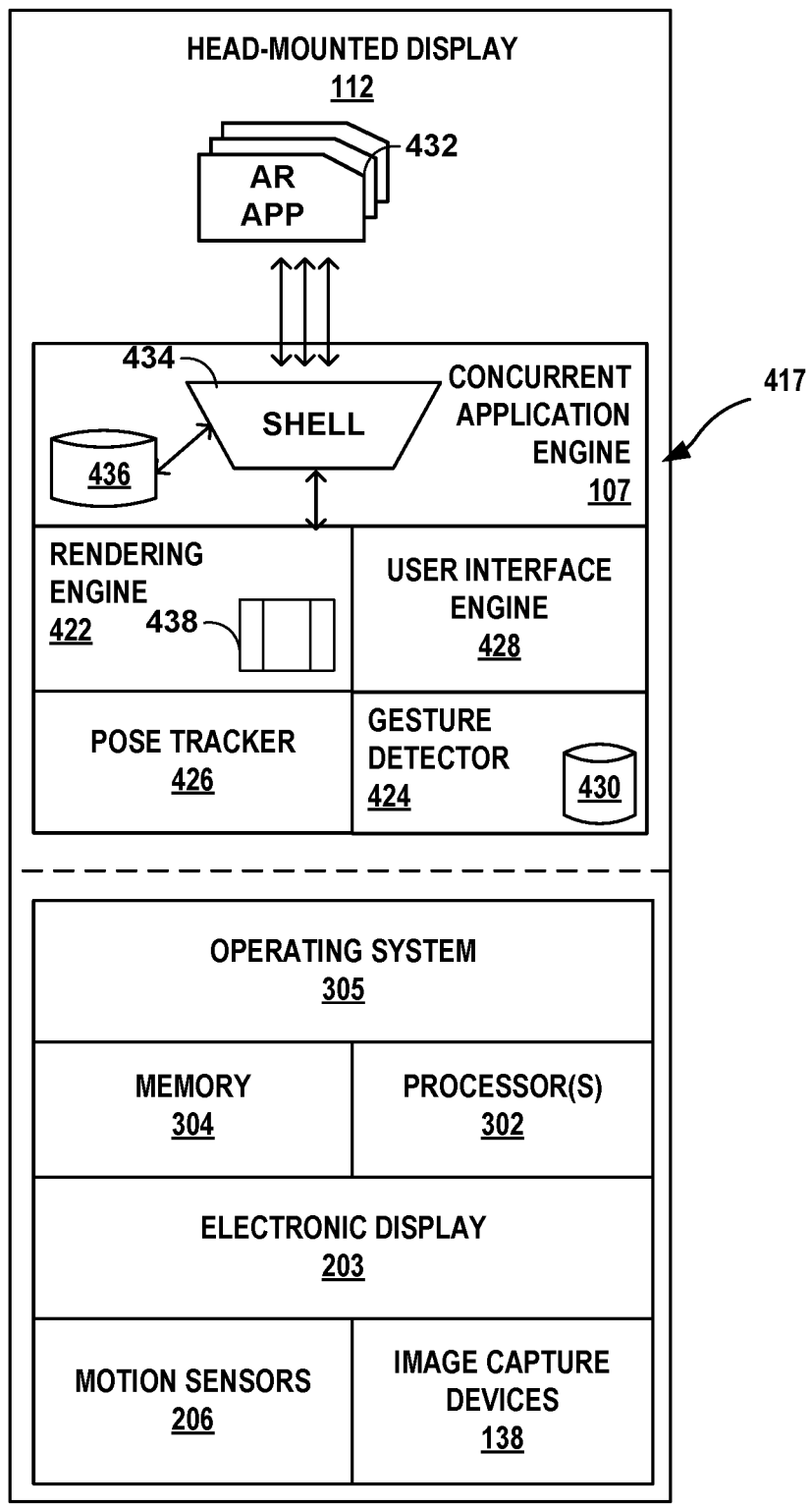
FIG. 4 is a block diagram depicting an example HMD of the artificial reality system that enables concurrent execution of multiple artificial reality applications and collaborative scene rendering, in accordance with the techniques of the disclosure.

FIG. 4 is a block diagram depicting an example in which HMD 112 of the artificial reality system that enables concurrent execution of multiple artificial reality applications and collaborative scene rendering, in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to generate and render multiple artificial reality applications concurrently running and outputting content for display within a common 3D AR scene. In this example, software applications 417 include concurrent application engine 107, rendering engine 422, gesture detector 424, pose tracker 426, and user interface engine 428. In various examples, software components 417 operate similar to the counterpart components of console 106 of FIG. 3 (e.g., concurrent application engine 107, rendering engine 322, gesture detector 324, pose tracker 326, and user interface engine 328) to aggregate and render a scene in which a plurality of artificial reality applications are concurrently running and displayed on the scene. In some examples, rendering engine 422 constructs the 3D, artificial reality content which may be overlaid, at least in part, upon the real-world, physical environment of user 110.

Similar to the examples described with respect to FIG. 3, concurrent application engine 107 includes functionality to provide and present an aggregation of content generated by a plurality of artificial reality applications 432. Concurrent application engine 107 may include, for example, one or more software packages, software libraries, hardware drivers, and/or Application Program Interfaces (APIs) for implementing an aggregation of a plurality of artificial reality applications 432 on console 106. As further described below, concurrent application engine 107 presents a client interface that may, in one example, be a scene graph API by which each of artificial reality applications 432 register with shell 434 of the concurrent application engine 107 and communicate modeling information of objects of the artificial reality applications for rendering within a common scene 438. For example, application developers may use a scene graph API to specify modeling information of objects (e.g., objects, properties of the objects, and relationships between objects) of artificial reality applications. Application developers may also use the scene graph API to specify offer areas (e.g., offer areas 150, 152 of FIGS. 1A, 1B) and requests for attachments to connect objects with the offer areas.

Shell 434 of concurrent application engine 107 aggregates modeling information of objects of the plurality of artificial reality applications and conveys aggregated AR content 436 to rendering engine 422 to be rendered on a common scene 438. As further described below with respect to FIG. 5, concurrent application engine 107 may include a client interface (e.g., API) by which the artificial reality applications register with a shell of concurrent application engine 107 and communicate modeling information of objects of artificial reality applications. For example, the client interface is a scene graph API that provides a set of functions by which application developers specify modeling information of objects of a plurality of artificial reality applications. For example, application developers may specify a scene graph including objects (referred to as "nodes" in a scene graph), modeling properties of the nodes, and relationships (e.g., spatial and logical) between the nodes of a graphical scene. In some examples, the application developers may use the client interface of concurrent application engine 107 to also specify offer areas and requests for attachments of objects to connect with the offer areas.

Concurrent application engine 107 aggregates modeling information of objects of the plurality of artificial reality applications and communicates aggregate modeling information 436 to rendering engine 422 for rendering a common scene 438, where the common scene may present a 3D scene collaboratively constructed and controlled by the plurality of artificial reality applications 432. For example, shell 434 of concurrent application engine 107 may process the modeling information, such as textures, meshes, nodes, and other abstractions of the objects of the plurality of artificial reality applications to construct aggregate content 436 for rendering by rendering engine 422.

Shell 434 of concurrent application engine 107 renders offer areas and processes (e.g., validates) requests for attachments to connect objects to the offer areas in common scene 438. For example, shell 434 of concurrent application engine 107 may render an offer area and validates whether specific objects can logically be placed on the offer area. For example, concurrent application engine 107 determines the layout of the offer area (e.g., based on metadata of the offer area) and validates whether the layout of the offer area may place a specific object on the offer area. If validated, shell 434 connects the specific object to the offer area.

Concurrent application engine 107 constructs the artificial content for display to user 110 in accordance with current pose information for a frame of reference, typically a viewing perspective of HMD 112, as determined by pose tracker 426. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112, such as movement information and user commands, and, in some examples, data from any external sensors 90 (FIGS. 1A, 1B), such as external cameras, to capture 3D information within the real world environment, such as motion by user 110 and/or feature tracking information with respect to user 110. Based on the sensed data, pose tracker 426 determines a current pose for the frame of reference of HMD 112 and, in accordance with the current pose, constructs the artificial reality content for communication, via the one or more I/O interfaces 415, to HMD 112 for display to user 110.

Similar to the examples described with respect to FIG. 3, concurrent application engine 107 may control interactions to the objects on the rendered scene, and delivers input and other signals for interested artificial reality applications. For example, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. Gesture detector 424 may track movement, including changes to position and orientation, of hand, digits, and/or arm based on the captured image data, and compare motion vectors of the objects to one or more entries in gesture library 430 to detect a gesture or combination of gestures performed by user 110. Gesture library 430 is similar to gesture library 330 of FIG. 3. Based on the detected gestures, concurrent application engine 107 may render the common scene with the dynamic updates to the objects on the scene, and delivers input and other signals for interested artificial reality applications.

Figure 5:
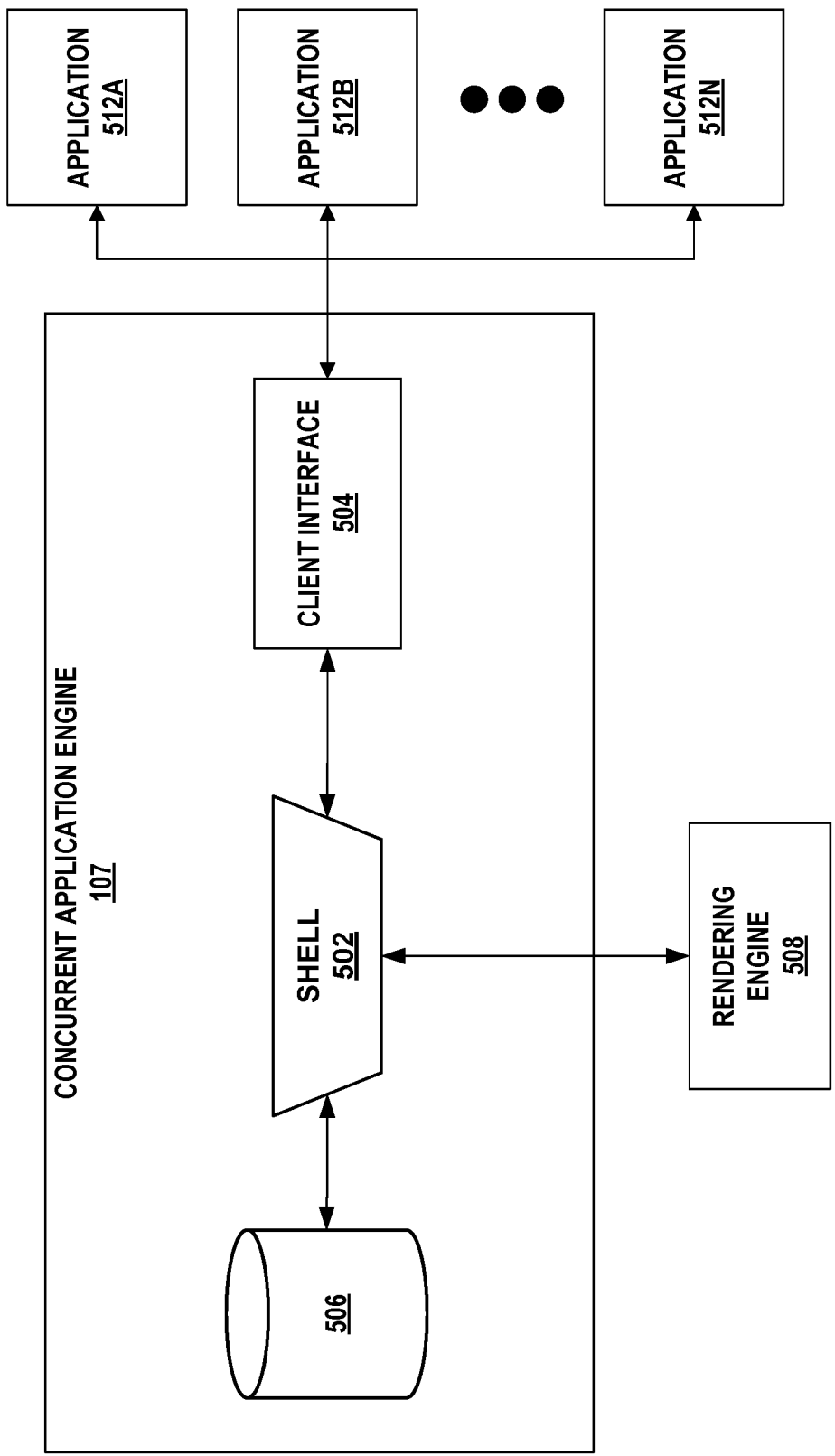
FIG. 5 is a block diagram illustrating the concurrent application engine in further detail, in accordance with the techniques of the disclosure.

FIG. 5 is a block diagram illustrating the concurrent application engine in further detail, in accordance with the techniques of the disclosure. Concurrent application engine 107 includes a centralized scene controller, e.g., shell 502, that presents client interface 504 by which one or more of client applications 512A-512N (collectively, "client applications 512") register with shell 502 and communicate 3D modeling information of client applications 512.

Client interface 504 includes an application programming interface (API) that includes a set of functions by which application developers use to build artificial reality applications for a common rendered scene. In some examples, client interface 504 includes a high-level scene graph API and a lower-level set of functions for connection management to shell 502. The high-level scene graph API provides a scene graph that is an abstraction over the lower-level set of functions for connection management. For example, a scene graph is a general data structure, such as a graph or tree structure, with objects (referred to as "nodes" in a scene graph), properties of the nodes, and relationships (e.g., spatial and logical) between the nodes of a graphical scene.

Client interface 504 communicates modeling information of objects for artificial reality applications to the shell. In some examples, the client interface and shell communicate using a serialization format protocol that defines a set of constructs, such as textures, meshes, nodes, and other abstractions for encoding objects. In some examples, the protocol is based on an extended GL Transmission Format (glTF) that is extended with 2D and animation extensions (e.g., animation can now control any plausibly-animatable property rather than just node transforms). That is, glTF is extended to enable scene graphs to specify the contents of a texture. In some examples, the glTF is also extended to communicate dynamic updates to the modeling information of the objects. Client interface 504 may export the scene graphs in a glTF-based format to communicate the modeling information of objects of the artificial reality applications to shell 502.

In some examples, the scene graph API is an object-oriented scene graph API, wherein the abstractions, such as geometry, materials, meshes, layers, and nodes are represented as reference-counted C++ objects. The scene graph API may also provide bindings for C, C# and Swift. In some examples, the scene graph API may also support Python or JavaScript. In this way, client interface 504 includes an API that supports multiple programming languages such that software developers may use a variety of programming languages to create the client applications.

The high-level scene graph API is processed to generate protocol buffers, server-side code, client-side code, and/or wrappers. Protocol buffers represent a wire-format for creating, updating, and/or deleting objects in the scene graph. Server-side code is generated for unmarshalling the scene graph and dealing with object creation and incremental updates, animations, 3D engine interactions, and automatic mirroring to additional shells.

The lower-level set of functions manage the connection with shell 502 and the lower-level details of the inter-process communication (IPC). For example, concurrent application engine 107 provides a serialization protocol (e.g., extended glTF) to deliver input and other signals between shell 502 and interested artificial reality applications 512 (e.g., to control objects and/or receive events, such as input or other signals).

In general, shell 502 controls rendering of content output from all registered artificial reality applications, controls interactions between the artificial reality applications, and delivers input and other signals for interested artificial reality applications. For example, shell 502 may receive one or more scene graph APIs of client applications 512 that define offer areas (e.g., offer areas 150, 152 of FIG. 1A). In some examples, shell 502 maintains aggregate modeling information 506 including defined offer areas and/or default areas provided by the shell. Shell 502 processes requests for attachments for objects (e.g., agenda object 142 and/or virtual media object 140 of FIG. 1A) placed on the offer areas. For example, shell 502 determines the layout of the of the offer areas and validate whether the objects may be placed on the offer areas. In some examples, shell 502 may automatically place objects on offer areas based on heuristic information of the offer area. For example, request for attachment for an offer area may specify dimensions of the offer area and objects to be placed on the offer area, semantic information that describes the offer area, and/or physics information of the offer area.

Shell 502 also processes interactive placement and manipulation of objects of a rendered scene. For example, shell 502 may constrain the attached objects to pre-allocated volumes in the scene, referred to as containers, to constrain objects within a certain volume and prevent the objects from occupying more space than was allocated to them and, for example, interfering with user interactions. Moreover, shell 502 may control interactions between the artificial reality applications, and deliver input and other signals, via the serialization protocol, for the interested artificial reality applications (e.g. to control objects and/or receive events, such as input or other signals). For example, as described above, a control unit of HMD and/or console performs object recognition within image data captured by image capture devices to identify a hand, fingers, thumb, arm or another part of the user, and track movements of the identified part to identify pre-defined gestures performed by the user. In response to identifying a pre-defined gesture, the control unit of the HMD and/or console takes some action, such as processing the interactive placement and/or manipulation of objects in the scene. In these examples, when an object is picked up, moved, and released in a different offer area or a different part of the offer area, shell 502 receives input corresponding to the identified gestures, via the serialization protocol, and may validate whether the object may be placed in the offer area and determines the layout of the offer area.

In some examples, shell 502 uses incoming protobuf messages to construct its own representations of the objects defined by the client applications. The protobuf messages are similar to the SceneTree API objects in that the protobuf messages include a C++ class for each of the object types defined by the protocol. In one example, the underlying platform-independent part of the shell provides the structures and operations to update 3D content state independent from the type of AI application, and the engine integration subclasses each object type and provides a function to update the engine state from any content delta message.

In some examples, shell 502 may enforce quality-of-service constraints. For example, shell 502 may constrain rendering complexity at the application (or sub-application) level, by simplifying rendering settings, adjusting geometry, and/or declining to render portions of a scene graph in response to resource availability.

After shell 502 aggregates modeling information of objects of the plurality of artificial reality applications, shell 502 communicates aggregate modeling information 506 to rendering engine 508 for rendering a common scene, where the common scene may present a 3D scene collaboratively constructed and controlled by the plurality of artificial reality applications 512.

Figure 6:
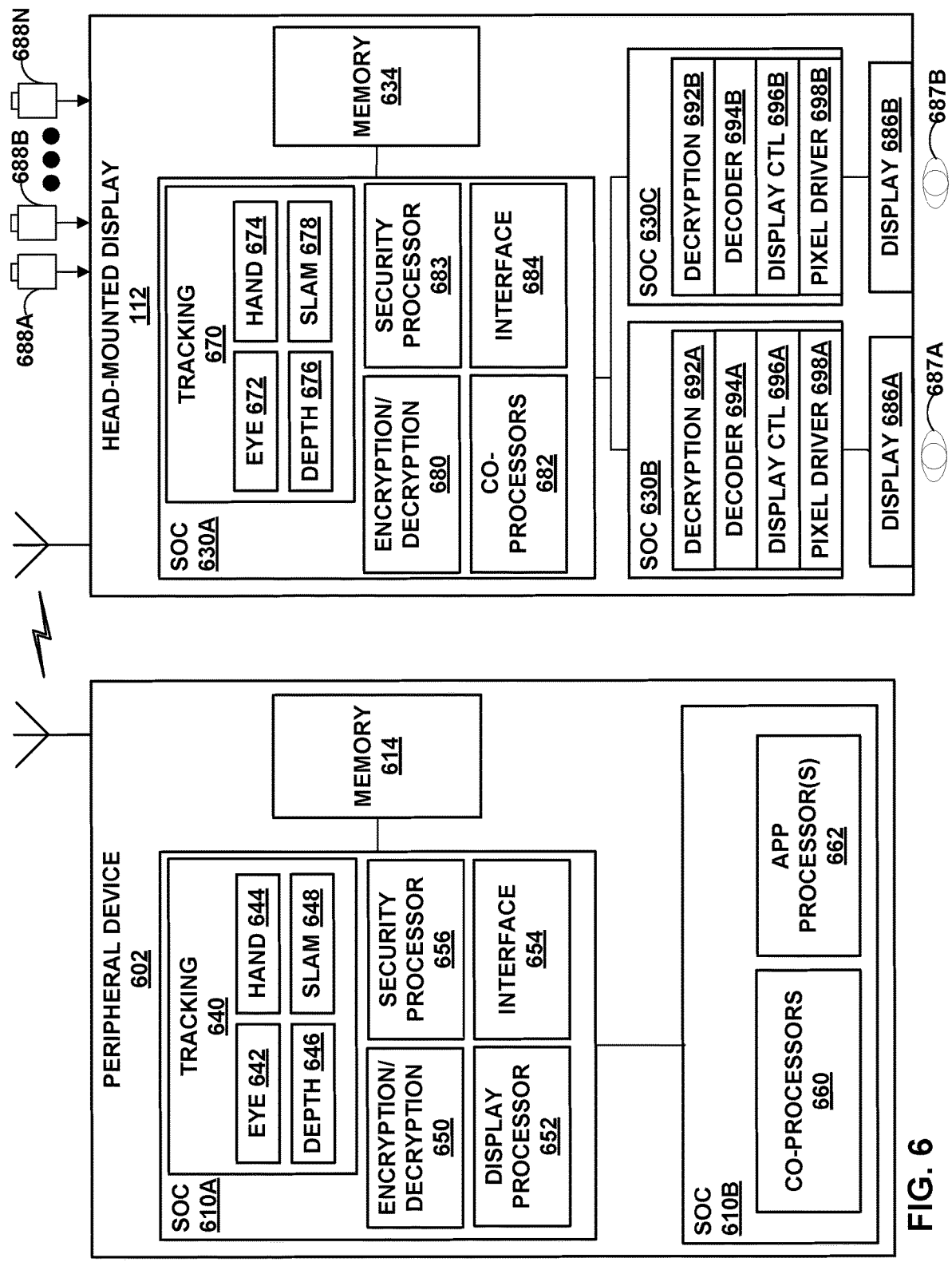
FIG. 6 is a block diagram illustrating a more detailed example implementation of a distributed architecture for a multi-device artificial reality system in which one or more devices are implemented using one or more SoC integrated circuits within each device, in accordance with the techniques described in this disclosure.

FIG. 6 is a block diagram illustrating a more detailed example implementation of a distributed architecture for a multi-device artificial reality system in which one or more devices are implemented using one or more SoC integrated circuits within each device. In some examples, artificial reality system includes a peripheral device 602 operating in conjunction with HMD 112. In this example, peripheral device 602 is a physical, real-world device having a surface on which the AR system overlays virtual content. Peripheral device 602 may include one or more presence-sensitive surfaces for detecting user inputs by detecting a presence of one or more objects (e.g., fingers, stylus) touching or hovering over locations of the presence-sensitive surface. In some examples, peripheral device 602 may include an output display, which may be a presence-sensitive display. In some examples, peripheral device 602 may be a smartphone, tablet computer, personal data assistant (PDA), or other hand-held device. In some examples, peripheral device 602 may be a smartwatch, smartring, or other wearable device. Peripheral device 602 may also be part of a kiosk or other stationary or mobile system. Peripheral device 602 may or may not include a display device for outputting content to a screen.

As described, HMD 112 is architected and configured to enable concurrent execution of multiple artificial reality applications and collaborative scene rendering in accordance with techniques described in this disclosure.

In general, the SoCs illustrated in FIG. 6 represent a collection of specialized integrated circuits arranged in a distributed architecture, where each SoC integrated circuit includes various specialized functional blocks configured to provide an operating environment for artificial reality applications. FIG. 6 is merely one example arrangement of SoC integrated circuits. The distributed architecture for a multi-device artificial reality system may include any collection and/or arrangement of SoC integrated circuits.

In this example, SoC 630A of HMD 112 comprises functional blocks including tracking 670, an encryption/decryption 680, co-processors 682, security processor 683, and an interface 684. Tracking 670 provides a functional block for eye tracking 672 ("eye 672"), hand tracking 674 ("hand 674"), depth tracking 676 ("depth 676"), and/or Simultaneous Localization and Mapping (SLAM) 678 ("SLAM 678"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 688A-688N (collectively, "image capture devices 688"). Image capture devices may include video cameras, laser scanners, Doppler radar scanners, depth scanners, or the like, configured to output image data representative of the physical environment. More specifically, image capture devices capture image data representative of objects (including peripheral device 602 and/or hand) in the physical environment that are within a field of view of image capture devices, which typically corresponds with the viewing perspective of HMD 112. Based on the sensed data and/or image data, tracking 670 determines, for example, a current pose for the frame of reference of HMD 112 and, in accordance with the current pose, renders the artificial reality content.

Encryption/decryption 680 is a functional block to encrypt outgoing data communicated to peripheral device 602 or security server and decrypt incoming data communicated from peripheral device 602 or security server. Encryption/decryption 680 may support symmetric key cryptography to encrypt/decrypt data with a session key (e.g., secret symmetric key).

Co-application processors 682 includes various processors such as a video processing unit, graphics processing unit, digital signal processors, encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 682. A plurality of artificial reality applications may be concurrently executed on co-application processors 682.

Security processor 683 provides secure device attestation and mutual authentication of HMD 112 when pairing with devices, e.g., peripheral device 606, used in conjunction within the AR environment. Security processor 683 may authenticate SoCs 630A-630C of HMD 112.

Interface 684 is a functional block that includes one or more interfaces for connecting to functional blocks of SoC 630A. As one example, interface 684 may include peripheral component interconnect express (PCIe) slots. SoC 630A may connect with SoC 630B, 630C using interface 684. SoC 630A may connect with a communication device (e.g., radio transmitter) using interface 684 for communicating with other devices, e.g., peripheral device 136.

SoCs 630B and 630C each represents display controllers for outputting artificial reality content on respective displays, e.g., displays 686A, 686B (collectively, "displays 686"). In this example, SoC 630B may include a display controller for display 668A to output artificial reality content for a left eye 687A of a user. For example, SoC 630B includes a decryption block 692A, decoder block 694A, display controller 696A, and/or a pixel driver 698A for outputting artificial reality content on display 686A. Similarly, SoC 630C may include a display controller for display 668B to output artificial reality content for a right eye 687B of the user. For example, SoC 630C includes decryption 692B, decoder 694B, display controller 696B, and/or a pixel driver 698B for generating and outputting artificial reality content on display 686B. Displays 668 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 602 includes SoCs 610A and 610B configured to support an artificial reality application. In this example, SoC 610A comprises functional blocks including tracking 640, an encryption/decryption 650, a display processor 652, an interface 654, and security processor 656. Tracking 640 is a functional block providing eye tracking 642 ("eye 642"), hand tracking 644 ("hand 644"), depth tracking 646 ("depth 646"), and/or Simultaneous Localization and Mapping (SLAM) 648 ("SLAM 648"). For example, peripheral device 602 may receive input from one or more accelerometers (also referred to as inertial measurement units or "IMUs") that output data indicative of current acceleration of peripheral device 602, GPS sensors that output data indicative of a location of peripheral device 602, radar or sonar that output data indicative of distances of peripheral device 602 from various objects, or other sensors that provide indications of a location or orientation of peripheral device 602 or other objects within a physical environment. Peripheral device 602 may in some examples also receive image data from one or more image capture devices, such as video cameras, laser scanners, Doppler radar scanners, depth scanners, or the like, configured to output image data representative of the physical environment. Based on the sensed data and/or image data, tracking block 640 determines, for example, a current pose for the frame of reference of peripheral device 602 and, in accordance with the current pose, renders the artificial reality content to HMD 112.

Encryption/decryption 650 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key).

Display processor 652 includes one or more processors such as a video processing unit, graphics processing unit, encoders and/or decoders, and/or others, for rendering artificial reality content to HMD 112.

Interface 654 includes one or more interfaces for connecting to functional blocks of SoC 510A. As one example, interface 684 may include peripheral component interconnect express (PCIe) slots. SoC 610A may connect with SoC 610B using interface 684. SoC 610A may connect with one or more communication devices (e.g., radio transmitter) using interface 684 for communicating with other devices, e.g., HMD 112.

As discussed with respect to the example of FIG. 6, security processor 656 provides secure device attestation and mutual authentication of peripheral device 602 when pairing with devices, e.g., HMD 112, used in conjunction within the AR environment. Security processor 656 may authenticate SoCs 610A, 610B of peripheral device 602.

SoC 610B includes co-application processors 660 and application processors 662. In this example, co-application processors 660 includes various processors, such as a vision processing unit (VPU), a graphics processing unit (GPU), and/or central processing unit (CPU). Application processors 662 may include a processing unit for executing one or more artificial reality applications to generate and render, for example, a virtual user interface to a surface of peripheral device 602 and/or to detect gestures performed by a user with respect to peripheral device 602.

Figure 7:
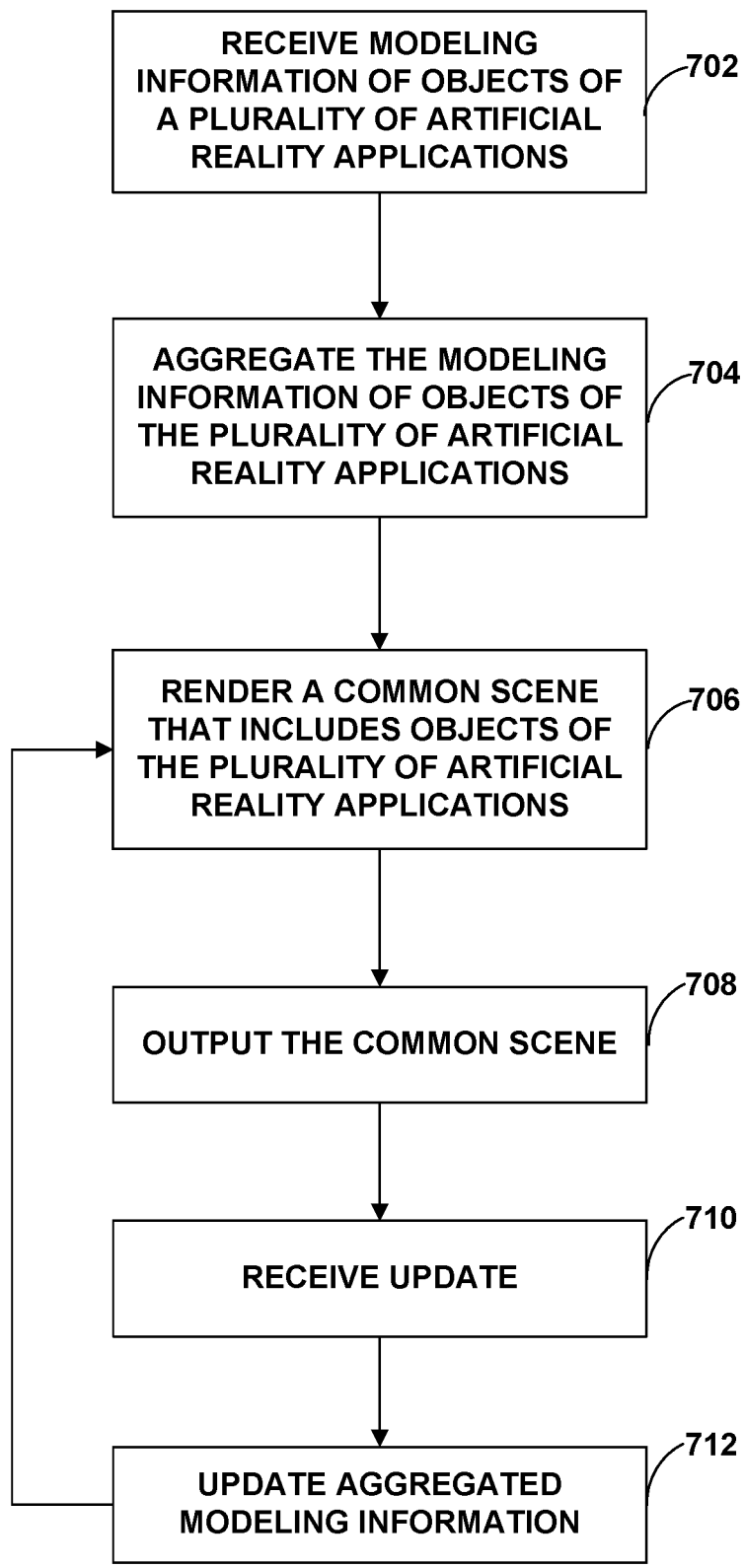
FIG. 7 is a flow diagram illustrating an example technique for an artificial reality system configured to generate a common scene of an artificial reality environment in which multiple artificial reality applications are concurrently running and displayed on the common scene, in accordance with the techniques of the disclosure.

FIG. 7 is a flow diagram illustrating an example technique for an artificial reality system configured to generate a rendered scene of an artificial reality environment in which multiple client applications are concurrently running and displayed on the rendered scene, in accordance with the techniques of the disclosure. The example operation may be performed by concurrent application engine 107 of HMD 112 or console 106, or in conjunction, from FIGS. 1A and 1B. The following are steps of the process, although other examples of the process performed in accordance with the techniques of this disclosure may include additional steps or may not include some of the below-listed steps.

In accordance with the techniques described herein, concurrent application engine 107 receives modeling information of objects of a plurality of artificial reality applications (702). For example, a client interface of the concurrent application engine may receive a high-level scene graph comprising a set of functions to specify the modeling information of the objects of the plurality of artificial reality applications.

Concurrent application engine 107 aggregates the modeling information of objects of the plurality of artificial reality applications (704). More specifically, a shell (e.g., shell 502 of FIG. 5) of concurrent application engine 107 aggregates modeling information of objects of the plurality of artificial reality applications to be rendered on a common scene in which the plurality of artificial reality applications are concurrently running and displayed on the common scene. The shell renders offer areas and processes (e.g., validates) the requests for attachments to connect objects to the offer areas. In some examples, the shell may automatically place objects on offer areas based on heuristic information of the offer areas.

Concurrent application engine 107 renders a common scene that includes the objects of the plurality of artificial reality applications (706). For example, the shell of concurrent application engine 107 renders a 3D visualization of the objects to the user such that the artificial reality applications are concurrently running and displayed on the common scene. A head-mounted display outputs the common scene in which the plurality of artificial reality applications are concurrently running and displayed on the common scene (708).

Concurrent application engine 107 may receive an update to objects of the plurality of artificial reality applications (710). For example, the shell of concurrent application engine 107 may receive dynamic updates such as user interaction to objects of the plurality of artificial reality applications. In other examples, the shell may receive other types of dynamic updates, such as network updates or sensor updates, for the artificial reality applications. As one example, the media content application (e.g., stock ticker) may receive periodic updates from the media content provider to be displayed on virtual media object 140. In this example, the shell of concurrent application engine 107 delivers input and other signals (e.g., stock ticker updates) for the media content application.

Based on the dynamic updates, concurrent application engine 107 updates the aggregated modeling information (712) and may render the common scene with the dynamic updates to the objects on the scene.

Figure 8A:
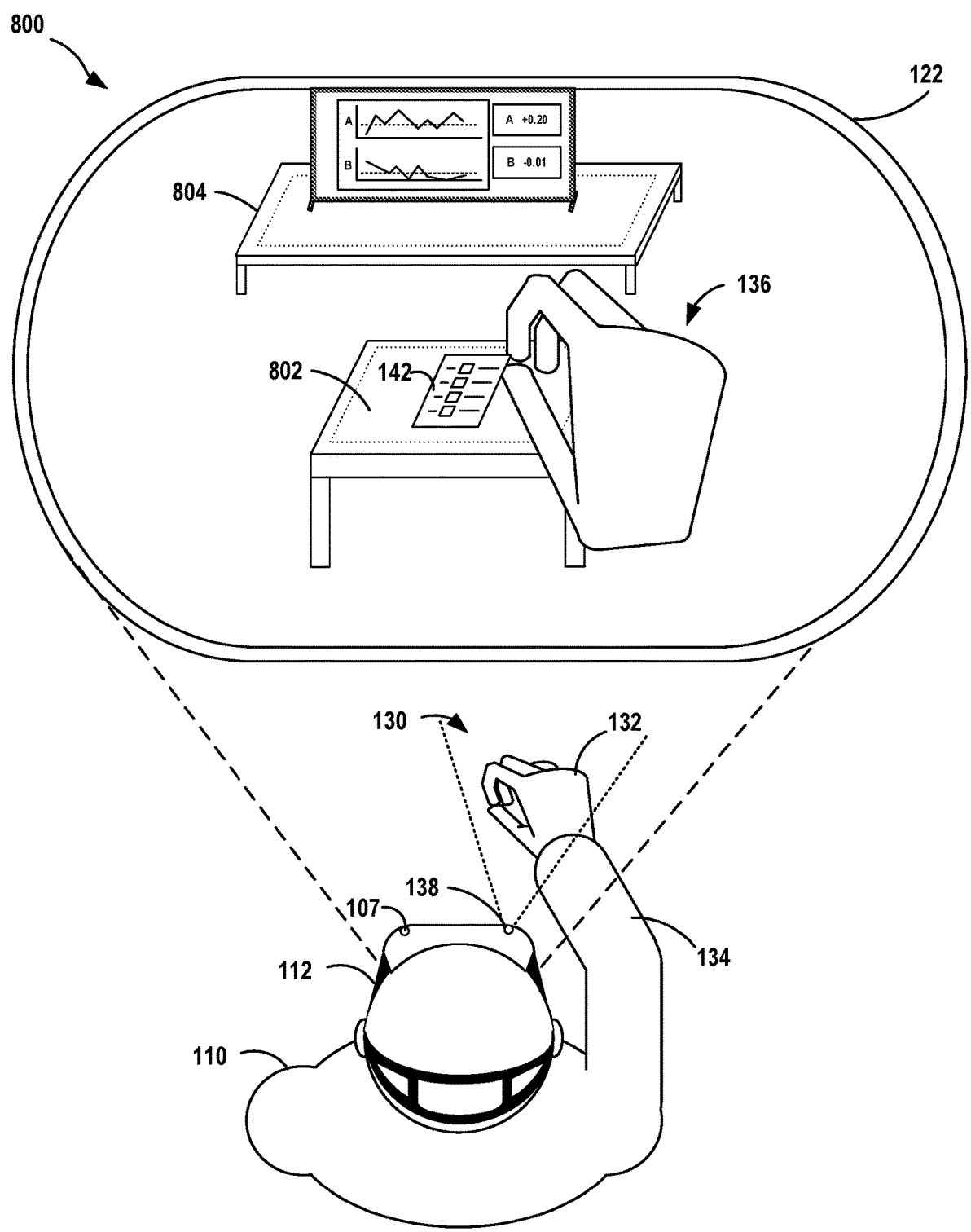
FIGS. 8A-8C are illustrations depicting a concurrent application engine controlling interactions to objects of a plurality of artificial reality applications rendered on a common scene, in accordance with techniques described in this disclosure.
Figure 8B:
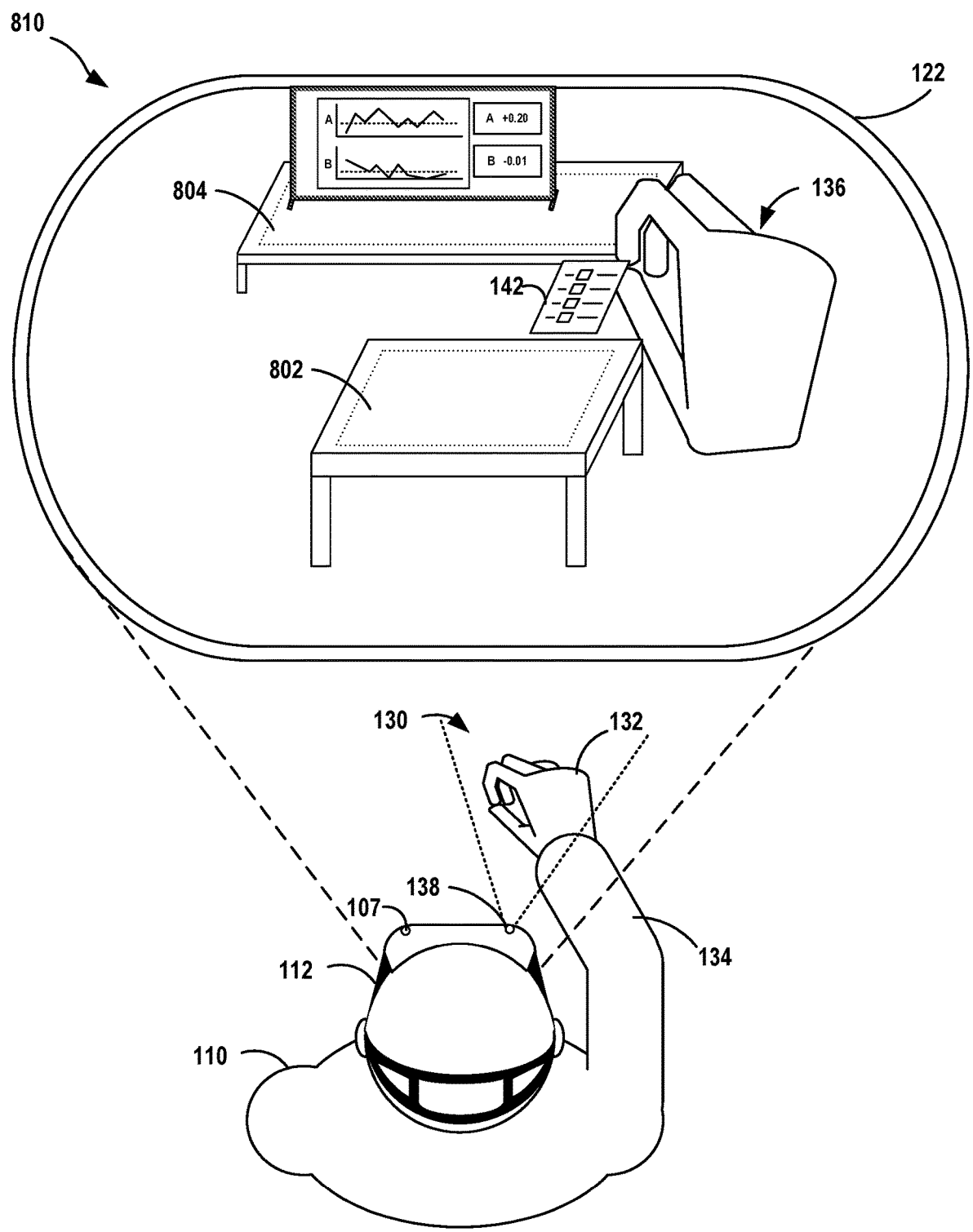
Figure 8C:
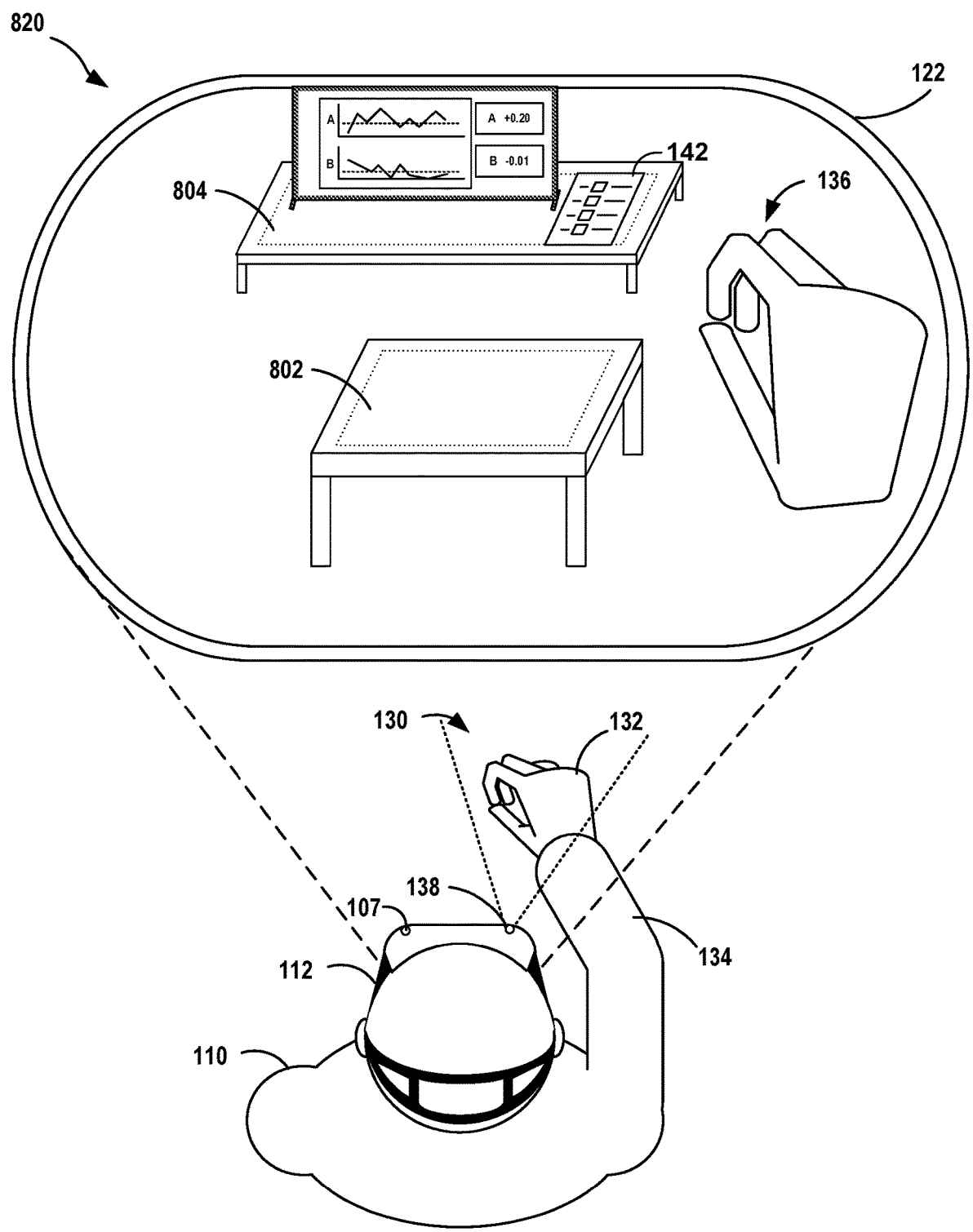

FIGS. 8A-8C are illustrations depicting a concurrent application engine 107 controlling interactions to objects of a plurality of artificial reality applications rendered on a common scene, in accordance with techniques described in this disclosure. As described below, concurrent application engine 107 detects a series of gestures, such as a selection gesture (e.g., pinching) on agenda object 142, a translation gesture to move agenda object 142 out of offer area 802, and deselection gesture to release agenda object 142 in another location within the offer area or to another offer area 804 within the artificial reality content.

FIG. 8A is an example HMD display 700 illustrating selection of objects of a common scene in which a plurality of artificial reality applications are currently running and outputting content for display on the common scene, in accordance with the techniques of this disclosure. HMD 112 of FIG. 8A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In the example illustrated in FIG. 8A, concurrent application engine 107 of the artificial reality system may render a first offer area 802 and a second offer area 804 for placement of one or more objects of a plurality of artificial reality applications. In this example, concurrent application engine 107 processes an attachment to connect agenda object 142 to first offer area 802.

In some examples, user 110 may interact with agenda object 142. For example, user 110 may perform a selection gesture, where hand 132 is positioned to grab agenda object 142 placed on first offer area 802. This grabbing position could be, in some instances, a two-finger pinch where two or more fingers of hand 132 of user 110 move closer to each other, performed in proximity to agenda object 142. User 110 may perform a subsequent gesture, such as a translation gesture, as further described in FIG. 7B below.

FIG. 8B is an example HMD display 810 illustrating a translation gesture of objects of a common scene in which a plurality of artificial reality applications are currently running and and outputting content for display on the common scene, in accordance with the techniques of this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In the example illustrated in FIG. 8B, user 110 may, in response to a selection gesture, perform a translation gesture, where hand 132 is moved from the first offer area 802 to a second offer area 804. In some examples, concurrent application engine 107 may render visual indicators of which offer areas may support the placement of the object. For example, concurrent application engine 107 may determine, based on the metadata of second offer area 704, whether the pose relative to agenda object 142, surface shape of second offer area 804, and/or size of second offer area 804 may support the placement of agenda object 142. In some examples, concurrent application engine 107 may automatically place the selected agenda object 142 within second offer area 804. In these examples, concurrent application engine 107 may determine, based on heuristic information including dimensions of second offer area 804 and agenda object 142, semantic information (e.g., what kinds of objects can be placed on the offer area type), and/or physics information (e.g., whether the object has enough support in the offer area, will the object slide or fall, will the object collide with other objects, etc.).

When agenda object 142 is no longer within first offer area 804, concurrent application engine 107 may remove the attachment that connects agenda object 142 to first offer area 804. User 110 may subsequently perform a deselection gesture at the desired destination of the move, as further described in FIG. 8C below.

FIG. 8C is an example HMD display 820 illustrating an interactive placement of objects of a scene in which a plurality of artificial reality applications are currently running and outputting content for display on the scene, in accordance with the techniques of this disclosure. In the example of FIG. 8C, hand 132 of user 110 may perform a deselection gesture, where two or more fingers of a user's hand move further from each other. In this example, hand 132 releases agenda object 142 on second offer area 804. Once agenda object 142 is released to second offer area 804, concurrent application engine 107 processes the attachment to connect agenda object 142 to second offer area 804 and renders the common scene with agenda object 142 placed on second offer area 804. For example, the centralized scene controller of concurrent application engine 107 constrains the attached objects to pre-allocated containers to constrain agenda object 142 within a certain volume and to prevent the objects from occupying more space than was allocated to the objects and, for example, interfering with user interactions.

In some examples, user 110 may also perform an altering gesture (e.g., scaling) to modify agenda object 142 (not illustrated in FIG. 8C) prior to releasing agenda object 142. In this example, concurrent application engine 107 may verify whether the second offer area 804 supports the placement of the scaled agenda object 142. In some examples in which the size of second offer area 804 does not support the scaled agenda object 142, concurrent application engine 107 may invalidate the move.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality VR, an augmented reality AR, a mixed reality MR, a hybrid reality, or some combination and/or derivatives thereof. Artificial reality content may include completely generated content or generated content combined with captured content (e.g., real-world photo-graphs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
   an image capture device configured to capture image data representative of a physical environment;
   a head-mounted display (HMD) configured to output artificial reality content;
   a plurality of concurrently executing artificial reality client applications;
   a concurrent application engine comprising processing circuitry and configured to control rendering the artificial reality content as a common scene that includes one or more objects from each of the plurality of artificial reality applications and to validate whether the one or more objects can logically be placed on a layout of one or more offer areas specified by the plurality of artificial reality applications.

2. The artificial reality system of claim 1, wherein the concurrent application engine is further configured to:
   provide a set of functions to specify modeling information of the objects from each of the plurality of artificial reality applications; and
   aggregate the modeling information of objects from each of the plurality of artificial reality applications received from a client interface.

3. The artificial reality system of claim 2, wherein the concurrent application engine is further configured to manage dynamic updates to the objects of the plurality of artificial reality applications.

4. The artificial reality system of claim 2, wherein the dynamic updates comprise at least one of a user interaction to the objects of the plurality of artificial reality applications and a network update to the plurality of artificial reality applications.

5. The artificial reality system of claim 2, wherein the concurrent application engine is further configured to:
   provide a high-level scene graph comprising the set of functions to specify the modeling information of objects from each of the plurality of artificial reality applications; and
   provide a low-level set of functions for communicating the modeling information of objects from each of the plurality of artificial reality applications with the shell.

6. The artificial reality system of claim 5, wherein the low-level set of functions is based on a serialization format protocol for communicating the modeling information of objects of the plurality of artificial reality applications to the shell.

7. The artificial reality system of claim 6, wherein the serialization format protocol is based on GL transmission format (glTF) extended to communicate the dynamic updates to the objects of the plurality of artificial reality applications.

8. The artificial reality system of claim 5, wherein the low-level set of functions comprises:
   one or more protocol buffers comprising a format for creating, updating, or deleting the objects specified in the high-level scene graph;
   server-side code for unmarshalling the high-level scene graph, creating the objects from each of the plurality of artificial reality applications, and updating the objects of the plurality of artificial reality applications;
   client-side code to represent a reference count of the high-level scene graph; and
   one or more wrappers that provide access to the high-level scene graph.

9. The artificial reality system of claim 2, wherein the modeling information from each of objects of the plurality of artificial reality applications comprises:
   the offer area that specifies a surface for placing the objects of any of the plurality of artificial reality applications; and
   a request for attachments that specify connections between the objects of the plurality of artificial reality applications and the offer area.

10. The artificial reality system of claim 9, wherein the offer area comprises metadata specifying a specific object to provide the offer area, pose of the offer area relative to the object, surface shape of the offer area, and size of the offer area.

11. The artificial reality system of claim 9, wherein the offer area comprises a first offer area, wherein a first object of the objects of the plurality of artificial reality applications is placed on the first offer area, further comprising:
   a gesture detector configured to identify, from the image data, a gesture to move the first from the first offer area to a second offer area,
   wherein the concurrent application engine is further configured to process the attachment that specifies a connection between the first object and the second offer area.

12. The artificial reality system of claim 9, wherein the concurrent application engine is further configured to automatically place the objects of any of the plurality of artificial reality applications on the offer area based on heuristic information of the offer area.

13. The artificial reality system of claim 12, wherein the heuristic information of the offer area comprises at least one of dimensions of the offer area and the objects placed on the offer area, semantic information including a type of the offer area and the objects placed on the offer area, and physics information of the offer area and the objects placed on the offer area.

* * * * *